United States Patent
Hirokane et al.

(12) 
(10) Patent No.: US 6,430,115 B1
(45) Date of Patent: Aug. 6, 2002

(54) MAGNETO-OPTICAL RECORDING DEVICE WITH THREE DISTINCT LAYERS

(75) Inventors: Junji Hirokane, Nara; Noboru Iwata, Tenri, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/386,135

(22) Filed: Aug. 31, 1999

(30) Foreign Application Priority Data

Sep. 8, 1998 (JP) .......................................... 10-253383

(51) Int. Cl.$^7$ .............................................. G11B 11/00
(52) U.S. Cl. ................. 369/13.43; 369/13.46; 369/13.44; 369/275.2
(58) Field of Search .............................. 369/13.4, 13.41, 369/13.42, 13.43, 13.44, 13.51, 13.05, 288, 116, 283, 275.2, 13.52, 13.53, 13.15, 13.46, 13.1; 428/694 EC, 694 MC, 694 MM, 332

(56) References Cited

U.S. PATENT DOCUMENTS

| | | | | |
|---|---|---|---|---|
| 5,278,810 A | * | 1/1994 | Takahashi et al. | |
| 5,498,485 A | | 3/1996 | Nakayama et al. | .. 428/694 ML |
| 5,623,458 A | * | 4/1997 | Matsumoto et al. | |
| 5,691,072 A | * | 11/1997 | Izumi et al. | |
| 5,740,133 A | * | 4/1998 | Tamanoi et al. | |
| 5,790,513 A | * | 8/1998 | Hiroki et al. | |
| 5,830,589 A | * | 11/1998 | Nishimura | |
| 5,863,649 A | * | 1/1999 | Hirokane et al. | ............ 428/332 |
| 5,939,187 A | * | 8/1999 | Hirokane et al. | ............ 428/332 |
| 5,955,191 A | * | 9/1999 | Hirokane et al. | |
| 6,178,143 B1 | * | 1/2001 | Hirokane et al. | ........ 369/13.51 |
| 6,272,077 B1 | * | 8/2001 | Takahashi et al. | ........ 369/13.43 |

FOREIGN PATENT DOCUMENTS

JP 9320134 12/1997

\* cited by examiner

Primary Examiner—Ali Neyzari

(57) ABSTRACT

A reproducing layer having perpendicular magnetization in a single layer, an in-plane magnetic layer, and a recording layer having perpendicular magnetization are formed in this order. When the reproducing layer, the in-plane magnetic layer, and the recording layer have the Curie temperatures of Tc1, Tc2, and Tc3, these values satisfy conditions of Tc2<Tc1 and Tc2<Tc3. The reproducing layer has in-plane magnetization due to an exchange coupling with the in-plane magnetic layer at lower than Tc2. At Tc2 or higher, magnetization information is expanded and transferred from the recording layer to the reproducing layer, so that the reproducing layer has single-domain perpendicular magnetization.

30 Claims, 14 Drawing Sheets

MEDIUM SHIFTING DIRECTION

↑ TM MOMENT   ⇧ LEAKAGE FLUX

MAGNETO-OPTICAL RECORDING DEVICE WITH THREE DISTINCT LAYERS

FIELD OF THE INVENTION

This invention relates to magneto-optical recording media including a magneto-optical disk, a magneto-optical tape, and a magneto-optical card adopted for a magneto-optical recording/reproducing device, and further concerns a reproducing device thereof.

BACKGROUND OF THE INVENTION

Conventionally, as a rewritable optical recording medium, a magneto-optical recording medium has been put into practical use. Such a magneto-optical recording medium has the drawback of degrading reproducing property when a diameter and spacing of a recording bit, that serve as a domain, become smaller relative to a beam diameter of a light beam, that is emitted from a semiconductor laser and is converged on the magneto-optical recording medium.

Such a drawback is caused by an adjacent recording bit which enters the beam diameter of the light beam converged on a desired recording bit so that individual recording bits are not separately reproduced.

In order to overcome the above-mentioned disadvantage, Japanese Published Unexamined Patent Application No. 320134/1997 (Tokukaihei 9-320134, published on Dec. 12, 1997) discloses a magneto-optical recording medium shown in FIGS. 30 and 31. The magneto-optical recording medium has a construction in which a reproducing layer a1 and a recording layer a4 are stacked via a non-magnetic intermediate layer a3. The reproducing layer a1 is in a state of in-plane magnetization at room temperature and enters a state of perpendicular magnetization at higher temperatures. The recording layer a4 is made of a perpendicularly magnetized film. In the magneto-optical recording medium which has a magnetostatic combination of the reproducing layer a1 and the recording layer a4, an in-plane magnetization layer a2 is formed so as to be adjacent to the reproducing layer a1. With this construction, in a region whose temperature is lower than the Curie temperature in the in-plane magnetization layer a2, it is possible to firmly fix the magnetization direction of the reproducing layer a1 at an in-plane direction, that is horizontal to the film surface. In a region whose temperature is not raised by irradiation of a light beam a5, namely, in a region whose temperature is lower than the Curie temperature in the in-plane magnetization layer a2, the reproducing layer a1 enters a state of complete in-plane magnetization so as to mask a recording domain a9.

Meanwhile, the reproducing layer a1 is in a perpendicular magnetization in a region which is irradiated with light beam up to more than the Curie temperature in the in-plane magnetization layer a2. The perpendicular magnetization direction of the reproducing layer a1 is allowed to correspond to a direction of leakage flux appearing in the recording layer a4 so as to transfer a recording domain a8 of the recording layer a4 onto the reproducing layer a1; thus, it is possible to reproduce merely the recording domain a8 which exists inside a light beam spot a6.

Here, the reproducing layer a1 needs to have in-plane magnetization at room temperature and enter a state of perpendicular magnetization at higher temperatures; therefore, unlike a compensation composition in which magnetic moment of a rare-earth metal(RE) and magnetic moment of a transition metal(TM) balance each other, RErich composition containing a large amount of rare-earth metal is necessary. Hence, in the reproducing layer, the transition metal(TM) moment and total magnetization oppose each other, and as shown in FIG. 31, TM moment and leakage flux are arranged in opposite directions in a region a7 which is raised in temperature.

As described above, the recording domain a8, which has merely an area raised in temperature, is transferred onto the reproducing layer a1 prior to reproduction, so that it is possible to reproduce a signal recorded in a period, which does not allow a reproduction light beam having a light beam spot diameter determined by an optical diffraction limit to reproduce.

However, upon reproduction using the conventional reproducing medium, when the recording domain a8 becomes smaller, a domain all transferred to the reproducing layer a1 also becomes smaller, resulting in reduction in intensity of a reproduction signal.

SUMMARY OF THE INVENTION

The objective of the present invention is to provide a magneto-optical recording medium and a reproducing device that reproduce a signal recorded in a period, which does not allow a reproduction light beam having a light beam spot diameter determined by an optical diffraction limit to reproduce, without reducing an amplitude of the reproduction signal.

In order to achieve this objective, the magneto-optical recording medium of the present invention includes a reproducing layer which has perpendicular magnetization from room temperature to the Curie temperature in a single layer, an in-plane magnetic layer which has in-plane magnetization from room temperature to the Curie temperature, and a recording layer which has perpendicular magnetization from room temperature to the Curie temperature, wherein Tc2<Tc1 and Tc2<Tc3 are satisfied, where Tc1 represents the Curie temperature of the reproducing layer, Tc2 represents the Curie temperature of the in-plane magnetic layer, and Tc3 represents the Curie temperature of the recording layer; and the reproducing layer includes an area which has a temperature of less than Tc2 and has in-plane magnetization due to an exchange coupling with the in-plane magnetic layer, and an area which has a temperature of more than Tc2 and has single-domain perpendicular magnetization due to expansion and transfer of magnetization information from the recording layer to the reproducing layer.

With this arrangement, magnetization information recorded in the recording layer is expanded and transferred to an area whose temperature is more than Tc2 in the reproducing layer, so that a large single domain is formed in the reproducing layer. Hence, even in the case when small bit information is recorded in the recording layer, a domain reflecting the bit information is expanded to the reproducing layer. Further, as described above, in the reproducing layer, a domain reflecting a specific bit information is expanded, so that a reproduction signal becomes less prone to the influence of a bit located around the specific bit. Therefore, even when a signal is recorded in the recording layer in a period which does not allow a reproduction light beam having a light beam spot diameter determined by an optical diffraction limit to reproduce, it is possible to reproduce the signal without reducing an amplitude of the reproduction signal.

Moreover, the magneto-optical recording medium of the present invention includes the reproducing layer which has perpendicular magnetization from room temperature to the Curie temperature, in a single layer, the in-plane magnetic layer which has in-plane magnetization from room temperature to the Curie temperature, and the recording layer which has perpendicular magnetization from room temperature to the Curie temperature, wherein Tc2<Tc1 and Tc2<Tc3 are satisfied, where Tc1 represents the Curie temperature of the reproducing layer, Tc2 represents the Curie temperature of the in-plane magnetic layer, and Tc3 represents the Curie temperature of the recording layer; and the reproducing layer and the recording layer have maximum total magnetization values at a temperature higher than Tc2.

With this arrangement, at a temperature higher than Tc2, in an area whose temperature is nearly a temperature where total magnetization of the reproducing layer and total magnetization of the recording layer reach maximum values, a heating operation is performed so as to include merely a single bit recorded in the recording layer; thus, leakage flux appearing merely from the bit can be magnetostatically coupled to magnetization of the reproducing layer whose temperature is more than Tc2. Therefore, it is possible to form a large domain in the reproducing layer merely in accordance with a magnetization direction of a single bit that is recorded in the recording layer, so that even when a signal is recorded in the recording layer in a period which does not allow a reproduction light beam having a light beam spot diameter determined by an optical diffraction limit to reproduce, it is possible to reproduce the signal without reducing an amplitude of the reproduction signal.

Further, the reproducing device of the present invention for reproducing magnetization information recorded in the magneto-optical recording medium, the magneto-optical recording medium including a reproducing layer which has perpendicular magnetization from room temperature to the Curie temperature, in a single layer, an in-plane magnetic layer which has in-plane magnetization from room temperature to the Curie temperature, and a recording layer which has perpendicular magnetization from room temperature to the Curie temperature, wherein Tc2<Tc1 and Tc2<Tc3 are satisfied, where Tc1 represents the Curie temperature of the reproducing layer, Tc2 represents the Curie temperature of the in-plane magnetic layer, and Tc3 represents the Curie temperature of the recording layer; and the reproducing layer includes an area which has a temperature of less than Tc2 and has in-plane magnetization due to an exchange coupling with the in-plane magnetic layer, and an area which has a temperature of more than Tc2 and has single-domain perpendicular magnetization due to expansion and transfer of magnetization information from the recording layer to said reproducing layer, the reproducing device being provided with a light emitting means for emitting light on the magneto-optical recording medium and a light receiving means for receiving light reflected from the magneto-optical recording medium, wherein upon reproduction, the light emitting means emits light on the magneto-optical recording medium so as to heat the in-plane magnetic layer to more than the Curie temperature.

With this arrangement, in the magneto-optical recording medium, magnetization information recorded in the recording layer is expanded and transferred to an area, whose temperature is increased to more than Tc2 by the light emitting means in the reproducing layer. Namely, a large single domain is formed in the reproducing layer; thus, even when a small bit information is recorded in the recording layer, a domain reflecting the bit information is expanded in the reproducing layer so as to improve intensity of a signal which is obtained by the light receiving means for receiving light reflected from the magneto-optical recording medium. Also, as described above, in the reproducing layer, a domain reflecting a specific bit information is expanded, so that a reproduction signal becomes less prone to the influence of a bit located around the specific bit. Therefore, even when a signal is recorded in the recording layer a period which does not allow a reproduction light beam having a light beam spot diameter determined by an optical diffraction limit to reproduce, it is possible to provide a reproducing device which can reproduce the signal without reducing an amplitude of the reproduction signal.

Further, the reproducing device of the present invention for reproducing magnetization information recorded in the magneto-optical recording medium, the magneto-optical recording medium including the reproducing layer which has perpendicular magnetization from room temperature to the Curie temperature, in a single layer, and the in-plane magnetic layer which has in-plane magnetization from room temperature to the Curie temperature, and the recording layer which has perpendicular magnetization from room temperature to the Curie temperature, wherein Tc2<Tc1 and Tc2<Tc3 are satisfied, where Tc1 represents the Curie temperature of the reproducing layer, Tc2 represents the Curie temperature of the in-plane magnetic layer, and Tc3 represents the Curie temperature of the recording layer; and at a temperature higher than Tc2, the reproducing layer and the recording layer have maximum total magnetization values, the reproducing device being provided with a light emitting means for emitting light on the magneto-optical recording medium, and a light receiving means for receiving light reflected from the magneto-optical recording medium, wherein upon reproduction, the light emitting means emits light on the magneto-optical recording medium so as to heat the in-plane magnetic layer to more than the Curie temperature.

With this arrangement, at a temperature higher than Tc2, in an area whose temperature is nearly a temperature where total magnetization of the reproducing layer and the total magnetization of the recording layer reach maximum values, the light emitting means performs a heating operation so as to include merely a single bit recorded in the recording layer; thus, leakage flux appearing merely from the bit can be magnetostatically coupled to magnetization of the reproducing layer whose temperature is more than Tc2. Therefore, it is possible to form a large domain in the reproducing layer merely in accordance with a magnetization direction of a single bit that is recorded in the recording layer, so that it is possible to improve the intensity of a signal which is obtained by the light receiving means for receiving light reflected from the magneto-optical recording medium. Consequently, even when a signal is recorded in the recording layer in a period which does not allow a reproduction light beam having a light beam spot diameter determined by an optical diffraction limit to reproduce, it is possible to provide a reproducing device which can reproduce the signal without reducing an amplitude of the reproduction signal.

For a fuller understanding of the nature and advantages of the invention, reference should be made to the ensuing detailed description taken in conjunction with the accompanying drawings.

DESCRIPTION OF THE EMBODIMENTS

[EMBODIMENT 1]

Referring to figures, the following explanation describes a magneto-optical medium and the reproduction principle of the present invention.

Figure 1:
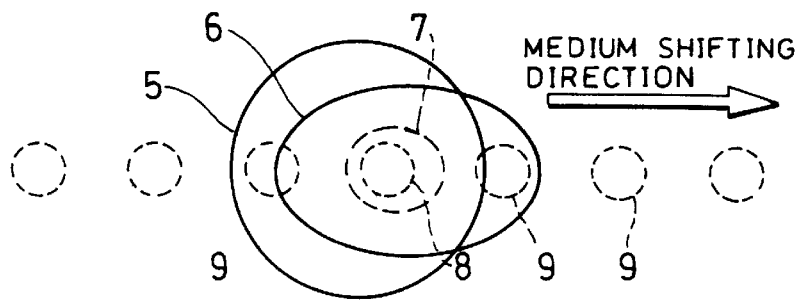
FIG. 1 is a plan diagram showing a reproducing operation performed on a magneto-optical recording medium of one embodiment of the present invention.
Figure 2:
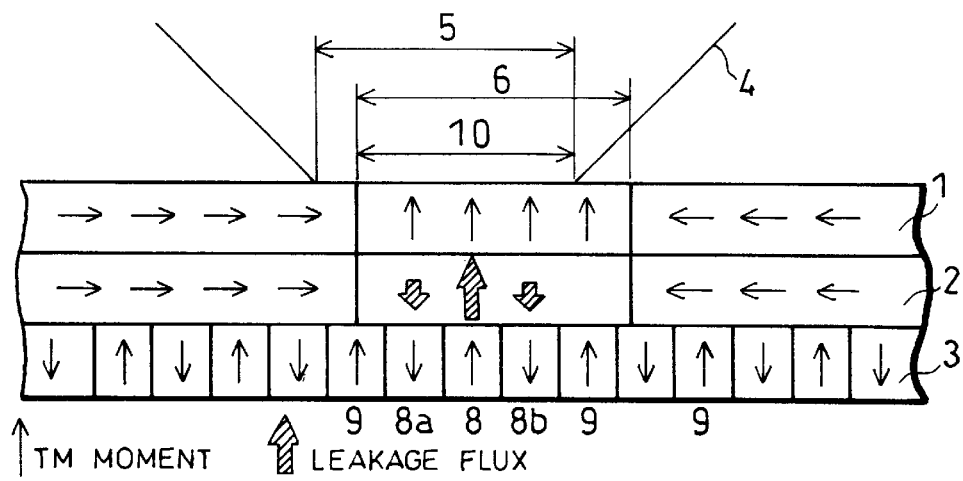
FIG. 2 is a sectional diagram showing the reproducing operation performed on the magneto-optical recording medium.

FIG. 1 is a plan view showing the magneto-optical recording medium of the present invention upon reproducing. FIG. 2 is a cross section of the magneto-optical recording medium shown in FIG. 1. In the magneto-optical recording medium, a reproducing layer 1, an in-plane magnetization layer 2, and a recording layer 3 are successively stacked. The reproducing layer has a perpendicularly magnetized film made of an alloy of rare earth transition metals, the in-plane magnetization layer 2 has in-plane magnetization at less than the Curie temperature, and the recording layer 3 has a perpendicularly magnetized film made of an alloy of rare earth transition metals.

When the reproducing layer 1, the in-plane magnetization layer 2, and the recording layer 3 respectively have the Curie temperatures of Tc1, Tc2, and Tc3, Tc2<Tc1 and Tc2<Tc3 are satisfied.

The in-plane magnetization layer 2 is in an in-plane magnetization between room temperature and the Curie temperature. The in-plane magnetization layer 2 is exchangeably coupled to the reproducing layer 1 at a temperature less than the Curie temperature Tc2, so that the reproducing layer 1 made of a perpendicularly magnetized film enters in-plane magnetization. With this arrangement, an in-plane magnetization mask is formed in the reproducing layer 1. A recording domain 9, which is positioned in the in-plane magnetization mask region, is not reproduced by a light beam 4.

Meanwhile, in an a reproducing temperature area 6 which is raised to more than a Curie temperature Tc2 in the in-plane magnetization layer 2, magnetization of the in-plane magnetization layer 2, that allows the reproducing layer 1 to enter in-plane magnetization through exchange coupling, disappears; thus, the reproducing layer 1 enters perpendicular magnetization.

As for the reproducing layer 1, the magnetic property is arranged so as to allow a width of a stably existing domain to be nearly the diameter of a light beam spot 5 or more. Therefore, the reproducing temperature area 6 of the reproducing layer is in the most stable condition when no domain wall exists, namely, when a single domain has the same magnetization directions. Additionally, as shown in FIG. 1, the reproducing temperature area 6 is positioned in the rear of the light beam spot 5 because the magneto-optical recording medium shifts.

The total magnetization of the recording layer 3 varies in size in accordance with a temperature distribution formed by the light beam 4. Further, in the recording layer 3, leakage flux appears in accordance with the size of the total magnetization. In the recording layer 3, the magnetic property is arranged so as to allow the maximum leakage flux to appear in a coupling temperature area 7(see FIG. 1).

Figure 32:
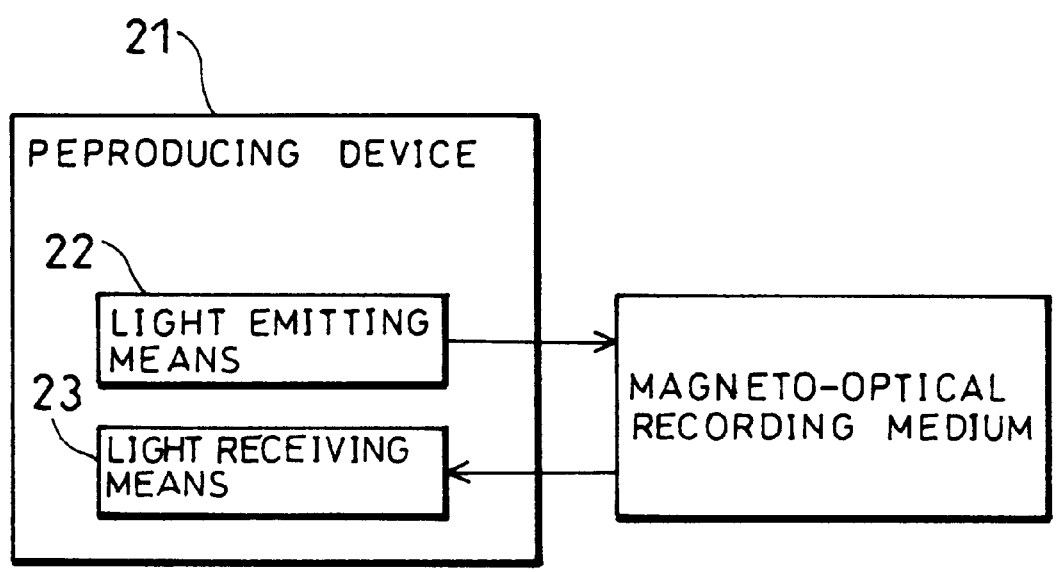
FIG. 32 is a block diagram schematically showing the construction of a reproducing device in accordance with one embodiment of the present invention.

Such a magneto-optical recording medium is reproduced as follows:

FIG. 32 is a block diagram schematically showing the construction of a reproducing device(optical pickup) 21 in accordance with the present invention. The reproducing device 21 is provided with a light emitting means 22 including a semiconductor laser for irradiating a laser beam onto the magneto-optical recording medium, and a light receiving means 23 for receiving light reflected in the magneto-optical recording medium. The light emitting means 22 and the light receiving means 23 constitute the optical pickup.

Upon reproducing, a light emitting means 22 of a reproducing device emits the light beam 4 onto the magneto-optical recording medium and heats the magneto-optical recording medium to a temperature sufficient for forming the coupling temperature area 7.

As shown in FIG. 2, with this arrangement, from the recording domain 8 of the recording layer 3 which exists in the coupling temperature 7, large leakage flux appears, and the magnetization direction of the recording domain 8 of the coupling temperature area 7 is transferred to the reproducing layer 1. Further, in the reproducing temperature area 6, the magnetic property is arranged so as to allow the reproducing layer 1 to be in a single domain state; therefore, in the reproducing layer 1, magnetization directions of the reproducing temperature area 6 are entirely aligned to the magnetization direction of the recording domain 8 of the recording layer 3. Namely, magnetization information of the recording layer 3 is expanded and transferred to the reproducing layer 1.

Moreover, in an area 10 which exists inside the light beam spot 5 and inside the reproducing temperature area 6, a reproduction signal appears as a reflected light and is reproduced by the light receiving means 23.

Figure 3:
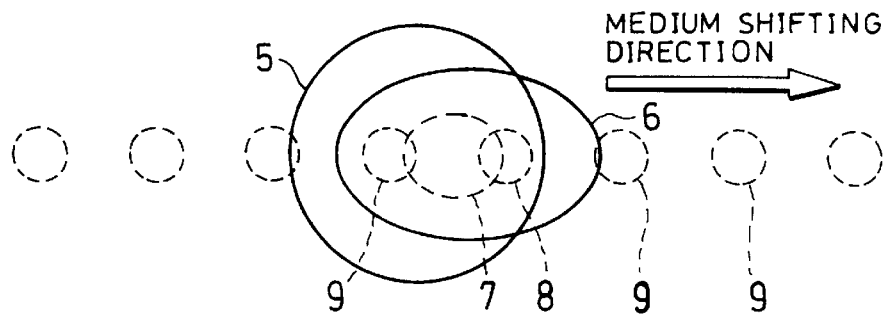
FIG. 3 is a plan diagram showing a reproducing operation performed after the magneto-optical recording medium has shifted from a position shown in FIG. 1.
Figure 4:
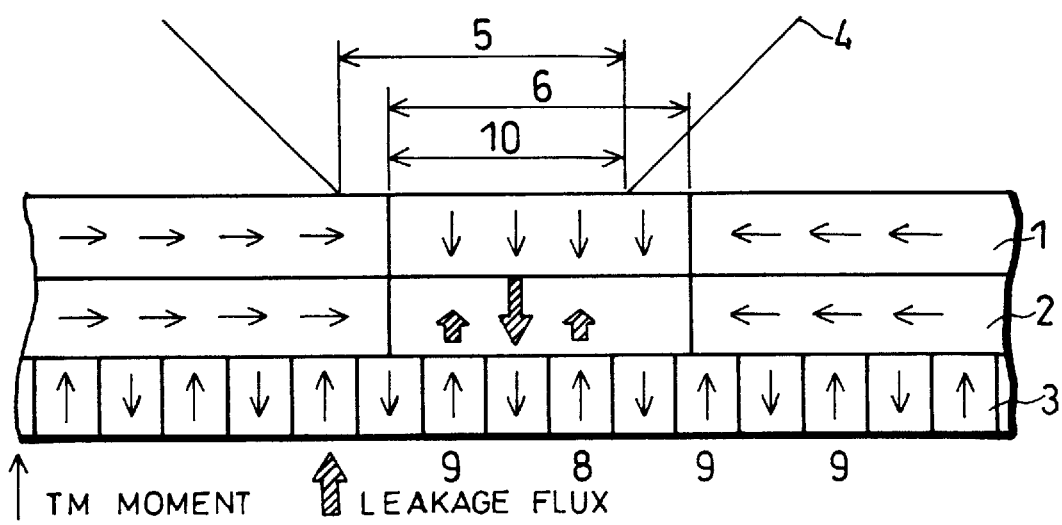
FIG. 4 is a sectional diagram showing the reproducing operation performed after the magneto-optical recording medium has shifted from a position shown in FIG. 1.

And then, as shown in FIGS. 3 and 4, when the coupling temperature area 7 shifts to a portion between the recording domains 8 and 9 in accordance with a shift of the magneto-optical recording medium, large leakage flux appears downward from the recording layer 3. The reproducing layer 1 is magnetostatically coupled to the downward leakage flux, and the downward magnetization of the recording layer 3 is expanded and transferred to the reproducing layer 1, so that in reproducing layer 1, the magnetization direction of the reproducing temperature area 6 is opposite from that of FIG. 2.

As described above, in the magneto-optical recording medium of the present invention, merely a single piece of magnetization information (magnetization information existing in the coupling temperature area 7) is expanded and transferred to the reproducing layer 1, and a single large domain is formed in the reproducing temperature 6; thus, it is possible to reduce influence of the other pieces of information (for example, 8a and 8b of FIGS. 2, 8 and 9 of FIG. 4, etc.) in the light beam spot 5. Hence, even in the case when a signal is recorded in a recording layer 3 in a period which does not allow a reproduction light beam having a light beam spot diameter determined by an optical diffraction limit to reproduce, it is possible to reproduce the signal without reducing the amplitude of the reproduction signal.

Additionally, in order to smoothly expand and transfer the magnetization information, as for the reproduction layer 1, in the same manner as the recording layer 3, it is desirable to arrange the magnetic property so as to increase the total magnetization in accordance with a temperature raised from room temperature to higher temperatures and so as to realize sufficiently large total magnetization in the coupling temperature area 7. As shown in FIG. 1, with this arrangement, in the case when the recording domain 8 exists in the coupling temperature area 7, large leakage flux appearing in the recording domain 8 of the coupling temperature area 7 is magnetostatically coupled to the large total magnetization of the reproducing layer 1 of the coupling temperature area 7. Therefore, with merely the effect of a magnetization direction regarding a domain of the recording layer 3, a large domain is readily formed in the reproducing layer 1.

In this case, at least in the reproducing temperature area 6, the reproducing layer 1 and the recording layer 3 need to have a TMrich composition containing a large amount of TM moment, instead of a compensation composition in which magnetic moment of a rare-earth metal(RE) and magnetic moment of a transition metal(TM) balance each other. In FIGS. 2 and 4, magnetization of the reproducing layer 1 and the recording layer 3 is shown in the direction of the TM moment. The both layers have the TMrich composition, and the direction of the TM moment is the same as that of the total magnetization.

Moreover, as described above, as for the reproducing layer 1 and the recording layer 3, when the magnetic property is arranged so as to have a sufficiently large total magnetization in the coupling temperature area 7, the temperatures, where the total magnetization is maximized in both layers, are allowed to virtually correspond to each other, and the light emitting means of the reproducing device heats the magneto-optical recording medium nearly to the temperatures upon reproducing. Thus, it is possible to smoothly carry out an expanding and reproducing operation.

The following explanation describes a more specific embodiment of the magneto-optical recording medium. Here, the following explanation discusses a case in which a magneto-optical disk is adopted as a magneto-optical disk.

Figure 5:
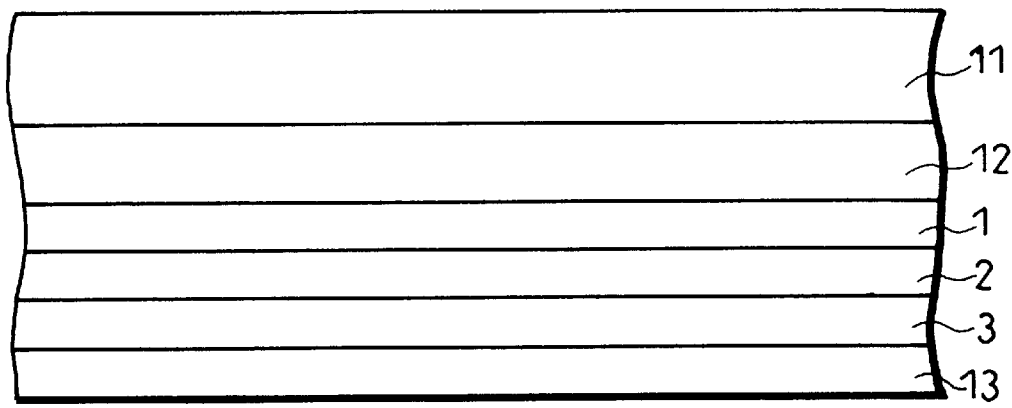
FIG. 5 is a sectional view schematically showing the construction of a magneto-optical disk of Embodiment 1.

As shown in FIG. 5, the magneto-optical disk of the present embodiment has a construction in which a transparent dielectric protecting layer 12, a reproducing layer 1, an in-plane magnetic layer 2, a recording layer 3, a protecting layer 13 are successively formed on a magneto-optical disk substrate 11.

As for such a magneto-optical disk, the Curie temperature recording method is adopted as a recording method. Specifically, a light beam 4 is emitted from a semiconductor laser and is converged onto the reproducing layer 1 via the substrate 1 and the transparent dielectric protecting layer 12 so as to raise the temperature of the recording layer 3 to more than the Curie temperature, and external magnetic field is added so as to control the magnetization direction of the recording layer 3; thus, a recording operation is carried out.

Further, upon reproducing information from the magneto-optical disk, the light beam 4 is set at lower power than upon recording, and information. is reproduced by using a magneto-optical effect that is known as a polar Kerr effect. The polar Kerr effect is a phenomenon in which magnetization being perpendicular to a light-incident surface changes the rotation of a polarizing surface of reflected light.

The substrate 11 is, for example, made of a transparent base material such as a polycarbonate and is made into a disk having a land and a groove for directing the light beam 4. In the present embodiment, it is possible to record in one of the land and the groove, or in both the land and the groove.

As the transparent dielectric protecting layer 12, it is desirable to use a transparent dielectric made of a material selected from AlN, SiN, AlSiN, and $Ta_2O_3$. The film thickness needs to be set so as to realize a favorable interference effect with regard to the incident light beam 4 and increase the polar Kerr rotation angle of the medium. On the assumption that the wavelength of the light beam 4 is λ and the refractive index of the transparent dielectric protecting layer 12 is n, the film thickness of the transparent dielectric protecting layer 12 is set at approximately ($\lambda/(4n)$). For example, if the wavelength of the light beam 4 is 680 nm, the film thickness of the transparent dielectric protecting layer 12 can be set approximately between 40 nm and 100 nm.

The reproducing layer 1 is made of a perpendicularly magnetized film which has a TMrich composition. The magnetic property is arranged so as to allow a width of a domain existing stably in the reproducing layer 1 to be nearly the diameter of a light beam spot 5 or more around the reproducing temperature. The light beam spot 5 is emitted for reproduction. Moreover, the reproducing layer 1 is exchangeably coupled to the in-plane magnetization layer 2, so that the reproducing layer 1 enters an in-plane magnetization in an area whose temperature is less than the Curie temperature of the in-plane magnetic layer 2.

It is desirable to set a Curie temperature Tc1 of the reproduction layer 1 between 200° C. and 360° C. In the case of Tc1<200° C., the Kerr rotation angle considerably decreases in accordance with a reduction in the Curie temperature of the reproducing layer 1, and the intensity of a reproduction signal is reduced, so that it is not possible to obtain a favorable reproducing property. Because of a decrease in the total magnetization of the reproducing layer 1, exchange coupling with the recording layer 3 becomes unstable, resulting in degradation in quality of a reproduction signal. In the case of Tc1>360° C., because of an increase in the Curie temperature of the reproducing layer 1, the reproducing layer 1 has large magnetization around the Curie temperature of the recording layer 3, and leakage flux appearing in the reproducing layer 1 affects the recording property so as to expand a recording magnetic field and to increase recording noise, resulting in degradation in quality of a reproduction signal.

Further, it is desirable to set a film thickness of the reproducing layer 1 between 20 and 80 nm. When the film thickness of the reproducing layer 1 is less than 20 nm, a light beam transmits the reproducing layer 1 and is reflected on the in-plane magnetization layer 2 so as to reduce light which is reflected in the reproducing layer 1. Therefore, the intensity of a reproduction signal is reduced and quality of the reproduction signal is degraded. Moreover, when a film thickness of the reproducing layer 1 is more than 80 nm, an increase in the film thickness considerably degrades the recording sensitivity.

As the reproducing layer 1 which realizes the above-mentioned magnetic property, it is possible to adopt a perpendicularly magnetized film made of a material selected from GdFe, GdFeCo, and GdNdFeCo.

The in-plane magnetic layer 2 is made of an in-plane magnetic film having a perpendicularly magnetized film made of an alloy of rare earth transition metals. At least, the Curie temperature is set lower than the Curie temperatures of the reproducing layer 1 and the recording layers 3. It is desirable to set the Curie temperature Tc2 of the in-plane magnetic layer 2 between 40° C. and 140° C. In the case of Tc2<40° C., the Curie temperature of the in-plane magnetic layer 2 is too low and the magnetization of the in-plane magnetization layer 2 becomes smaller. Thus, an area, whose temperature is not increased in the reproducing layer 1, has difficulty in maintaining a stable in-plane magnetization, resulting in degradation in quality of a reproduction signal. In the case of Tc1>140° C., in-plane magnetization is maintained at higher temperatures, so as to reduce an area serving as an expanded domain and the intensity of a reproduction signal, resulting in degradation in quality of the signal.

Further, it is desirable to set a film thickness of the in-plane magnetic layer 2 between 40 nm and 80 nm. When the film thickness of the in-plane magnetic layer 2 is less than 40 nm, the exchange coupling force is transmitted from the recording layer 3 through the in-plane magnetic layer 2 to the reproducing layer 1, so that an area whose temperature is not increased in the reproducing layer 1 has difficulty in maintaining a stable in-plane magnetization, resulting in degradation in quality of a reproduction signal. Moreover, when a film thickness of the in-plane magnetic layer 2 is more than 80 nm, the recording sensitivity is considerably degraded due to an increase in a film thickness.

As the in-plane magnetic layer 2 which achieves the above magnetic property, it is possible to adopt an in-plane magnetic film which is made of materials selected from: GdFe and GdFeD or GdFeCoD(D is made of one or more elements selected from Y, Ti, V, Cr, Pd, Cu, Si, and Al), and GdHRFe, GdHRFeCo, or GdHRFeCoD(HR is a heavy rare earth metal, and is made of one or more elements selected from Tb, Dy, Ho, and Er, and D is made of one or more elements selected from Y, Ti, V, Cr, Pd, Cu, Si, and Al), and GdLRFe, GdLRFeCo, or GdLRFeCoD(LR is a light rare earth metal, and is made of one or more elements selected from Ce, Pr, Nd, and Sm, and D is made of one or more elements selected from Y, Ti, V, Cr, Pd, Cu, Si, and Al).

The recording layer 3 is made of a perpendicularly magnetized film, which has an alloy of rare earth transition metals. At least, the Curie temperature is set higher than the Curie temperature of the in-plane magnetic layer 2. It is desirable to set the Curie temperature Tc3 of the recording layer 3 between 180° C. and 300° C. In the case of Tc3<180° C., the Curie temperature of the recording layer 3 is too low, so that upon reproducing, when the in-plane magnetic layer 2 is heated to more than the Curie temperature and the recording domain 8 is expanded and transferred to the reproducing layer 1, a slight increase in temperature heats the recording layer 3 to more than the Curie temperature, thereby erasing recorded information and narrowing a reproducing power margin. Further, in accordance with a reduction in the Curie temperature of the recording layer 3, leakage flux appearing in the recording layer 3 becomes smaller, so that the reproducing layer 1 and the recording layer 3 have difficulty in maintaining a stable magnetostatic coupling, resulting in degradation in quality of a reproduction signal. In the case of Tc3>300° C., upon recording, it is necessary to heat the recording layer 3 to more than 300° C., so that the recording sensitivity is considerably degraded. When the reproducing layer 1, the in-plane magnetic layer 2, and the recording layer 3 are heated to more than 300° C., magnetic property is degraded in each of the magnetic layers, so that quality of reproduction signal is degraded upon erasing records.

Moreover, it is desirable to set a film thickness of the recording layer 3 between 30 nm and 120 nm. When the film thickness of the recording layer 3 is less than 30 nm, leakage flux appearing in the recording layer 3 becomes smaller, so that the reproducing layer 1 and the recording layer 3 have difficulty in maintaining a stable magnetostatic coupling, resulting in degradation in quality of a reproduction signal. Additionally, when the film thickness of the recording layer 3 is more than 120 nm, the recording sensitivity is degraded due to an increase in the film thickness.

As the recording layer 3 which achieves the above-mentioned magnetic property, it is possible to adopt a perpendicularly magnetized film which is made of materials selected from: TbFe, TbFeCo, DyFe, DyFeCo, TbDyFe, TbDyFeCo, TbFeD, TbFeCoD, DyFeD, DyFeCoD, TbDyFeD, and TbDyFeCoD(D is made of one or more elements selected from Y, Ti, V, Cr, Pd, Cu, Si, and Al).

The protecting layer 13 is made of a transparent dielectric, which is made of materials selected from AlN, SiN, AlSiN, and $Ta_2O_3$, or made of an alloy of non-magnetic metals, which are made of metals selected from Al, Ti, Ta, and Ni. The protecting layer 13 is formed in order to prevent the alloy of rare earth transition metals, which are used for the reproducing layer 1, the in-plane magnetic layer 2, and the recording layer 3, from being subjected to oxidization. The film thickness is set between 5 nm and 60 nm.

Additionally, with this arrangement, it is possible to add a thermal dispersion metal layer, which is made of materials selected from Al, AlTa, AlTi, AlCr, AlNi, AlCo, and Cu, so that a thermal property of the medium can be improved. Further, in some cases, an ultraviolet cure resin, a heat cure resin, or a lubricant layer can be formed on the protecting layer 13 or the thermal dispersion metal layer.

In order to record in a low magnetic field, at a position being contact with the recording layer 3, it is also possible to stack and form a perpendicularly magnetized film such as an auxiliary recording layer 24 having a perpendicularly magnetized film which is made of materials selected from GdFeCo, GdTbFeCo, and GdDyFeCo. The perpendicularly magnetized film has a smaller coercivity and a higher Curie temperature as compared with the recording layer 3.

EXAMPLE 1

Next, the following explanation describes a specific example of a method for forming a magneto-optical disk having such a construction, and a method for reproducing a record.

(1) A Forming Method of the Magneto-optical Disk

The following explanation describes a forming method of the magneto-optical disk having the above-mentioned construction.

Firstly, a substrate 11, which is made of a polycarbonate formed into a disk so as to include a land and a groove, is disposed in a sputtering device which is provided with an Al alloy target, a GdFeCo alloy target, a GdFeSi alloy target, and a TbFeCo alloy target. Further, after the inside of the sputtering device has been evacuated to $1 \times 10^{-6}$ Torr, a mixed gas of argon and nitrogen is filled therein, electricity is applied to the Al alloy target so as to form a transparent dielectric protecting layer 12 made of AlN with a thickness of 80 nm on the substrate 11, under the condition of a gas pressure of $4 \times 10^{-3}$ Torr.

Next, after the inside of the sputtering device has been evacuated to $1 \times 10^{-6}$ Torr again, a gas of argon is filled therein, electricity is applied to the GdFeCo alloy target so as to form a reproducing layer 1 made of $Gd_{0.25}(Fe_{0.88}Co_{0.12})_{0.75}$ with a film thickness of 40 nm on the transparent dielectric protecting layer 12, under the condition of a gas pressure of $4 \times 10^{-3}$ Torr. The reproducing layer 1 has a compensation temperature of 0° C. and a Curie temperature of 280° C. And then, merely the reproducing layer 1 is made into a film, a protecting film is formed, and then, the magnetization is examined. As a result, it is found that the reproducing layer 1 is a perpendicularly magnetized film which continuously has perpendicular magnetization with regard to the film surface, from room temperature to the Curie temperature.

And then, successively, electricity is applied to the GdFeSi alloy target so as to form an in-plane magnetic layer 2 made of $(Gd_{0.37}Fe_{0.63})_{0.80}Si_{0.20}$ with a film thickness of 60 nm on the reproducing layer 1, under the condition of a gas pressure of $4 \times 10^{-3}$ Torr. The in-plane magnetic layer 2 has a Curie temperature of 80° C. and continuously has horizontal magnetization with regard to the film surface from room temperature to the Curie temperature.

And then, successively, electricity is applied to the TbFeCo alloy target so as to form a recording layer 3 made of $Tb_{0.26}(Fe_{0.84}Co_{0.16})_{0.74}$ with a film thickness of 60 nm on the in-plane magnetic layer 2, under the condition of a gas pressure of $4 \times 10^{-3}$ Torr. The recording layer 3 is a perpendicularly magnetized film with a compensation temperature of 50° C. and a Curie temperature of 260° C., and continuously has perpendicular magnetization with regard to the film surface.

Next, a mixed gas of argon and nitrogen is filled therein, electricity is applied to the Al alloy target so as to form a protection layer 13 made of AlN with a film thickness of 20 nm on the recording layer 3, under the condition of a gas pressure of $4 \times 10^{-3}$ Torr.

And then, in a state in which the transparent dielectric protecting layer 12, the reproducing layer 1, the in-plane magnetic layer 2, the recording layer 3, and the protecting layer 13 are stacked, the magnetization of the reproducing layer 1 is examined. As a result, it is confirmed that the reproducing layer 1 continuously has in-plane magnetization from room temperature to the Curie temperature of the in-plane magnetic layer 2, and have perpendicular magnetization at more than the Curie temperature of the in-plane magnetic layer 2.

Figure 6:
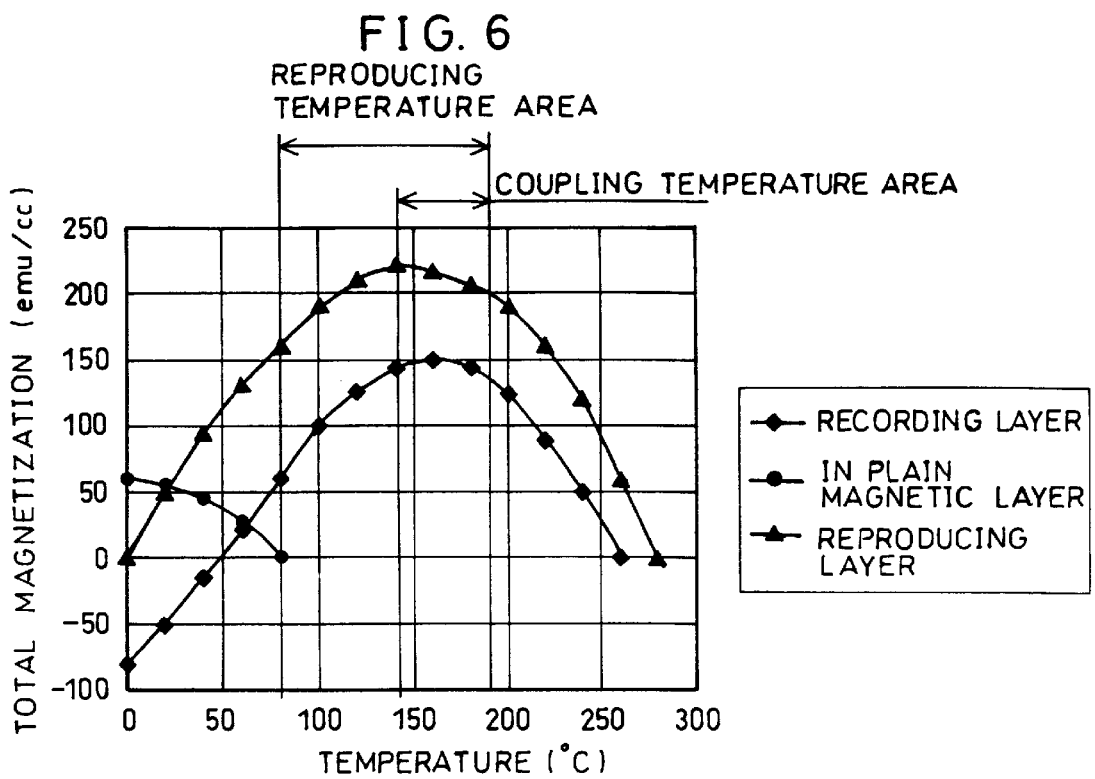
FIG. 6 is a graph showing dependence of total magnetization on temperature, regarding one example of the magneto-optical disk.

Next, FIG. 6 is a graph showing dependence on temperature relative to total magnetization of each of the reproducing layer 1, the in-plane magnetization layer 2, and the recording layer 3. The total magnetization of the in-plane magnetic layer 2 exists until the Curie temperature(80° C.). Therefore, at 80° C. or less, the reproducing layer 1 is exchangeably coupled to the in-plane magnetic layer 2 so as to enter in-plane magnetization. Further, the reproducing layer 1 and the recording layer 3 have a TMrich composition in a reproducing temperature area 6. The total magnetization is maximized in a coupling temperature area 7. Since the reproducing layer 1 and the recording layer 3 have larger total magnetization, the reproducing layer 1 and the recording layer 3 are magnetostatically coupled to each other firmly, the magnetization information of the recording layer 3 is transferred to the reproducing layer 1. Further, the magnetic property is arranged so as to allow a width of a domain existing stably in the reproducing layer 1 to be the same as the diameter of a light beam spot 5 or more in the reproducing temperature area 6. Therefore, as the most stable condition, it is possible to realize a state in which no domain wall exists in the reproducing temperature area 6, namely, a single domain in which all magnetization directions are the same. In the coupling temperature area 7, magnetization transferred to the reproducing layer 1 is expanded and transferred to the entire reproducing temperature area 6.

(2) Recording and Reproducing Property

The following explanation describes an evaluation result, in which the magneto-optical disk is evaluated by using a magneto-optical pickup which adopts a semiconductor laser having a wavelength of 680 nm, under the condition of a linear speed of 2.5 m/s.

Firstly, a recording magnetic field is modulated at ±15 kA/m so that repeated patterns of upward magnetization and downward magnetization are formed on the recording layer 3 in accordance with the direction of the recording magnetic field, under a continuous irradiation of a recording/reproducing laser of 6 mW. Further, a modulation frequency is changed on the recording magnetic field so that a domain pattern having a mark length between 0.1 and 0.5 m is recorded. Here, the mark length means that the recording domain whose length corresponds to the mark length is formed with a pitch which is twice as long as the mark length.

Figure 7:
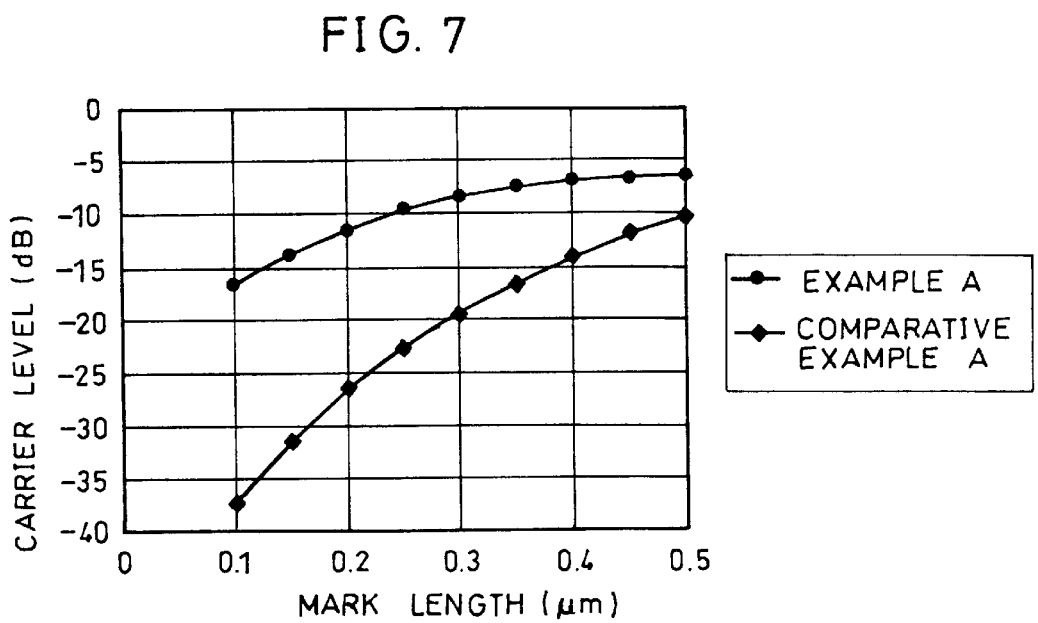
FIG. 7 is a graph showing dependence of a carrier level on a mark length, regarding the magneto-optical disk of the example.

Next, FIG. 7 is a graph showing a relationship between the mark length and a carrier level of the magneto-optical disk. In FIG. 7, Example A shows a dependence of a carrier level (signal intensity level) on the mark length in the magneto-optical disk having the above construction. The dependence is measured with a continuously irradiated recording/reproducing laser of 2.5 mW.

Figure 30:
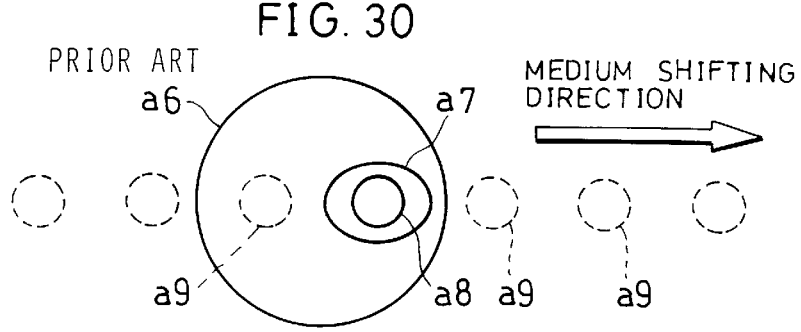
FIG. 30 is a plan diagram showing a reproducing operation of a conventional magneto-optical disk.
Figure 31:
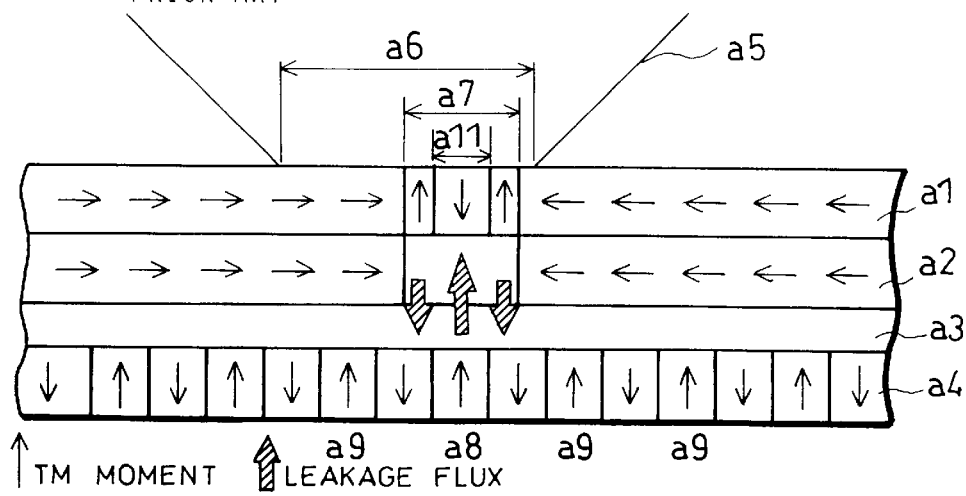
FIG. 31 is a sectional diagram showing the reproducing operation of the conventional magneto-optical disk.

Further, for example, as Comparative Example A, FIG. 7 shows a dependence of a carrier level on the mark length in a magneto-optical recording medium disclosed in Japanese Published Unexamined Patent Application No. 320134/1997 (Tokukaihei 9-320134), which is shown in FIGS. 30 and 31 of conventional art.

Comparative Example A shows a magneto-optical recording medium in which: AlN is used as a transparent dielectric layer with a film thickness of 80 nm, $Gd_{0.30}(Fe_{0.80}Co_{0.20})_{0.70}$, which has an RErich composition at room temperature, is used as a reproducing layer with a film thickness of 40 nm, $(Gd_{0.11}Fe_{0.89})_{0.75}Al_{0.25}$ is used as an in-plane magnetic layer with a film thickness of 20 nm, AlN is used as a non-magnetic intermediate layer with a film thickness of 4 nm, $(Gd_{0.50}Dy_{0.50})_{0.23}(Fe_{0.80}Co_{0.20})_{0.77}$ is used as a recording layer with a film thickness of 40 nm, and AlN is used as a protecting layer with a film thickness of 20 nm.

As for Comparative Example A, a film construction and the Curie temperature of the recording layer are different from those of Example A; thus, evaluation is made at recording laser power of 6.2 mW and reproduction laser power of 2.0 mW.

As described in the conventional art, in Comparative Example A, a recording domain a8 is transferred to a reproducing layer 1 without changing the size; thus, when a mark length becomes shorter, the carrier level is sharply reduced. Meanwhile, in Example A, the recording domain a8 is expanded and transferred to the reproducing layer 1, so that it is possible to obtain a relatively large carrier level as compared with that of Comparative Example A, and the carrier level can be reduced in a relatively gentle manner, when the mark length is shortened; consequently, a large carrier level can be achieved even when the mark length is short.

[SECOND EMBODIMENT]

Referring to figures, the following explanation describes a second embodiment of the present invention. The present embodiment discusses a case in which a magneto-optical disk is adopted as a magneto-optical medium.

Figure 8:
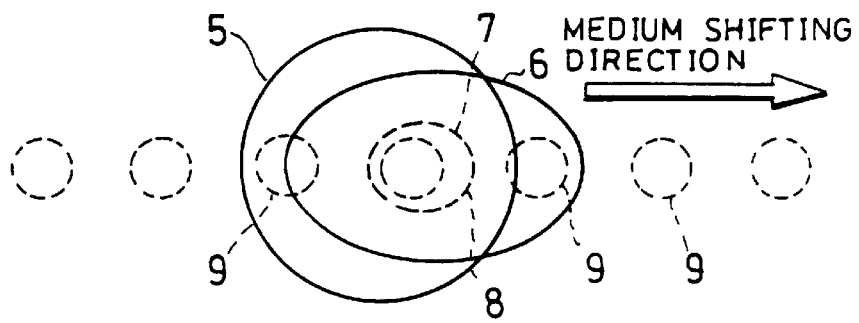
FIG. 8 is a plan diagram showing a reproducing operation performed on a magneto-optical disk of Embodiment 2.
Figure 9:
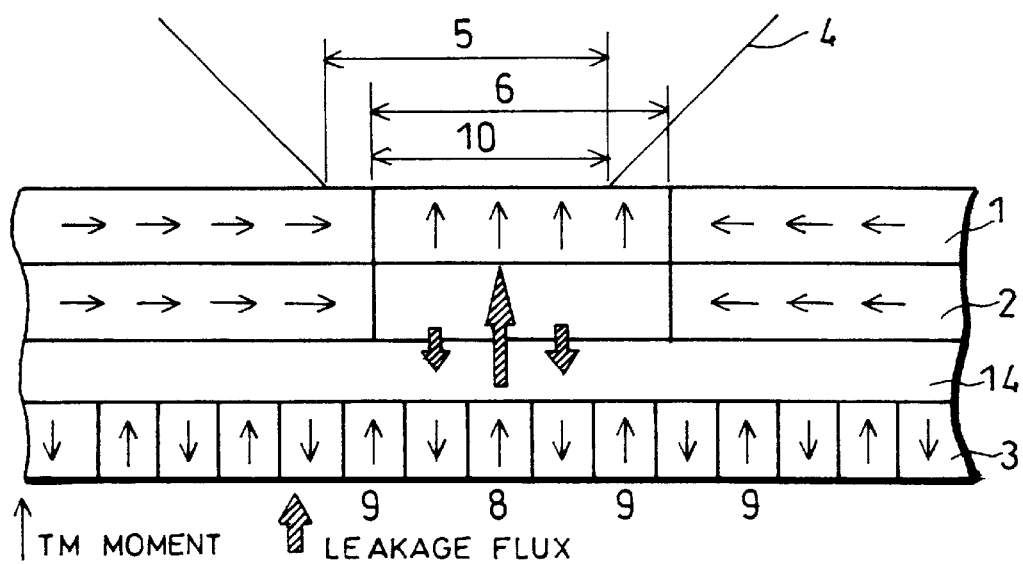
FIG. 9 is a sectional diagram showing the reproducing operation performed on the magneto-optical disk.

FIGS. 8 is a plan view showing a reproducing state of the magneto-optical disk of the second embodiment and FIG. 9 is a cross section of the magneto-optical disk of FIG. 8. In the second embodiment, a non-magnetic layer 14 is provided between an in-plane magnetic layer 2 and a recording layer 3 of the first embodiment shown in FIGS. 1 and 2.

The second embodiment has the same principle as the first embodiment as follows: a recording domain 8, which is formed in a recording layer 3, is expanded and transferred to a reproducing layer 1, and is reproduced by a light beam 4.

In the second embodiment, the non-magnetic layer 14 completely shields an exchange coupling between the in-plane magnetic layer 2 and the recording layer 3; thus, it is possible to more stably maintain in-plane magnetization of the reproducing layer 1 in an area whose temperature is less than the Curie temperature of the in-plane magnetic layer 2, by using the in-plane magnetic layer 2 having a smaller film thickness.

Figure 10:
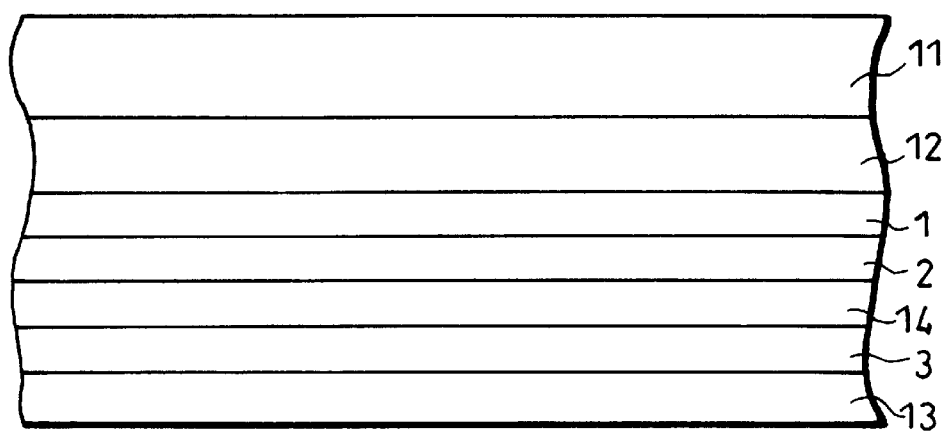
FIG. 10 is a sectional view schematically showing the construction of the magneto-optical disk.

As shown in FIG. 10, the magneto-optical recording disk of the present invention has a construction in which a transparent dielectric protecting layer 12, a reproducing layer 1, an in-plane magnetic layer 2, a non-magnetic layer 14, a recording layer 3, and a protecting layer 13 are successively stacked on a magneto-optical disk substrate 11.

As for the second embodiment, it is desirable to set a film thickness of the in-plane magnetic layer 2 between 5 nm and 80 nm. When the film thickness of the in-plane magnetic layer 2 is less than 5 nm, the in-plane magnetic layer 2 becomes too thin. Thus, an area, whose temperature does not increase in the reproducing layer 1, has difficulty in maintaining a stable in-plane magnetization, resulting in degradation in quality of a reproduction signal. Further, when the thickness of the in-plane magnetic layer 2 is more than 80 nm, the recording sensitivity is considerably degraded due to an increase in the film thickness.

The non-magnetic layer 14 has a transparent dielectric, which is made of materials selected from AlN, SiN, AlSiN, and $Ta_2O_3$, or has an alloy of non-magnetic metals, which are made of metals selected from Al, Ti, Ta, and Ni. The non-magnetic layer 14 is formed in order to shield the exchange coupling between (a)the reproducing layer 1 and the in-plane magnetic layer 2 and (b)the recording layer 3. It is desirable to set the film thickness at between 0.5 and 40 nm. When the film thickness of the non-magnetic layer 14 is less than 0.5 nm, it becomes difficult to stably shield the exchange coupling between the reproducing layer 1 and the in-plane magnetic layer 2 and the recording layer 3, resulting in degradation in quality of a reproduction signal. Moreover, when the film thickness of the non-magnetic layer 14 is more than 40 nm, a distance between the reproducing layer 1 and the recording layer 3 becomes too large; thus, it becomes difficult to maintain a stable magnetostatic coupling between the reproducing layer 1 and the recording layer 3, resulting in degradation in quality of the reproduction signal.

Further, a thermal dispersion metal layer, which is made of materials selected from Al, AlTa, AlTi, AlCr, AlNi, AlCo, and Cu, can be further added to the above-mentioned construction so that it is possible to improve a thermal property of the medium. Further, in some cases, an ultraviolet cure resin, a heat cure resin, or a lubricant layer can be formed on the protecting layer 13 or the thermal dispersion metal layer.

Moreover, in order to record in a low magnetic field, at a position being contact with the recording layer 3, it is also possible to stack and form an auxiliary recording layer having a perpendicularly magnetized film made of materials selected from GdFeCo, GdTbFeCo, and GdDyFeCo. The perpendicularly magnetized film has a smaller coercivity and a higher Curie temperature as compared with the recording layer 3.

EXAMPLE 2

Next, the following explanation describes a specific example of a method for forming a magneto-optical disk having such a construction, and a method for reproducing a record.

(1) A Forming Method of the Magneto-optical Disk

The following explanation describes a forming method of the magneto-optical disk having the above-mentioned construction.

Firstly, a substrate 11, which is made of a polycarbonate formed into a disk so as to include a land and a groove, is disposed in a sputtering device which is provided with an AlSi alloy target, a GdFeCo alloy target, a GdFeSi alloy target, and a TbFeCo alloy target. Further, after the inside of the sputtering device has been evacuated to $1\times10^{-6}$ Torr, a mixed gas of argon and nitrogen is filled therein, electricity is applied to the AlSi alloy target so as to form a transparent dielectric protecting layer 12 made of AlN with a thickness of 80 nm on the substrate 11, under the condition of a gas pressure of $4\times10^{-3}$ Torr.

Next, after the inside of the sputtering device has been evacuated to $1\times10^{-6}$ Torr again, a gas of argon is filled therein, electricity is applied to the GdFeCo alloy target so as to form a reproducing layer 1 made of $Gd_{0.25}(Fe_{0.88}Co_{0.12})_{0.75}$ with a film thickness of 40 nm on the transparent dielectric protecting layer 12, under the condition of a gas pressure of $4\times10^{-3}$ Torr. The reproducing layer 1 is a perpendicularly magnetized film having a compensation temperature of 0° C. and a Curie temperature of 280° C. And then, merely the reproducing layer 1 is made into a film, a protecting film is formed, and the magnetization is examined. As a result, it is found that the reproducing layer 1 is a perpendicularly magnetized film which continuously has perpendicular magnetization with regard to the film surface, from room temperature to the Curie temperature.

And then, successively, electricity is applied to the GdFeSi alloy target so as to form an in-plane magnetic layer 2 made of $(Gd_{0.37}Fe_{0.63})_{0.80}Si_{0.20}$ with a film thickness of 20 nm on the reproducing layer 1, under the condition of a gas pressure of $4\times10^{-3}$ Torr. The in-plane magnetic layer 2 is an in-plane magnetic film having a Curie temperature of 80° C. and continuously has horizontal magnetization with regard to the film surface.

Next, electricity is applied to the AlSi alloy target so as to form a non-magnetic layer 14 made of AlSi with a film thickness of 3 nm on the in-plane magnetic layer 2, under the condition of a gas pressure of $4\times10^{-3}$ Torr.

And then, successively, electricity is applied to the TbFeCo alloy target so as to form a recording layer 3 made of $Tb_{0.26}(Fe_{0.84}Co_{0.16})_{0.74}$ with a film thickness of 60 nm on the in-plane magnetic layer 2, under the condition of a gas pressure of $4\times10^{-3}$ Torr. The recording layer 3 is a perpendicularly magnetized film having a compensation temperature of 50° C. and a Curie temperature of 260° C., and continuously has perpendicular magnetization with regard to the film surface from room temperature to the Curie temperature.

Next, a mixed gas of argon and nitrogen is filled therein, electricity is applied to the AlSi alloy target so as to form a protection layer 13 made of AlSiN with a film thickness of 20 nm on the recording layer 3, under the condition of a gas pressure of $4\times10^{-3}$ Torr.

And then, in a state in which the transparent dielectric protecting layer 12, the reproducing layer 1, the in-plane magnetic layer 2, the non-magnetic layer 14, the recording layer 3, and the protecting layer 13 are stacked, the magnetization of the reproducing layer 1 is examined. As a result, it is confirmed that the reproducing layer 1 continuously has in-plane magnetization from room temperature to the Curie temperature of the in-plane magnetic layer 2, and have perpendicular magnetization at more than the Curie temperature of the in-plane magnetic layer 2.

(2) Recording and Reproducing Property

The following explanation describes an evaluation result, in which the magneto-optical disk is evaluated by using a magneto-optical pickup which adopts a semiconductor laser having a wavelength of 680 nm, under the condition of a linear speed of 2.5 m/s.

Firstly, a recording magnetic field is modulated at ±15 kA/m under a continuous irradiation of a recording/reproducing laser of 5.5 mW, so that repeated patterns of upward magnetization and downward magnetization are formed on the recording layer 3 in accordance with the direction of the recording magnetic field. Further, a modulation frequency is changed on the recording magnetic field, so that a domain pattern having a mark length between 0.1 and 0.5 $\mu$m is recorded. Here, the mark length means that the recording domain whose length corresponds to the mark length is formed with a pitch which is twice as long as the mark length.

Figure 11:
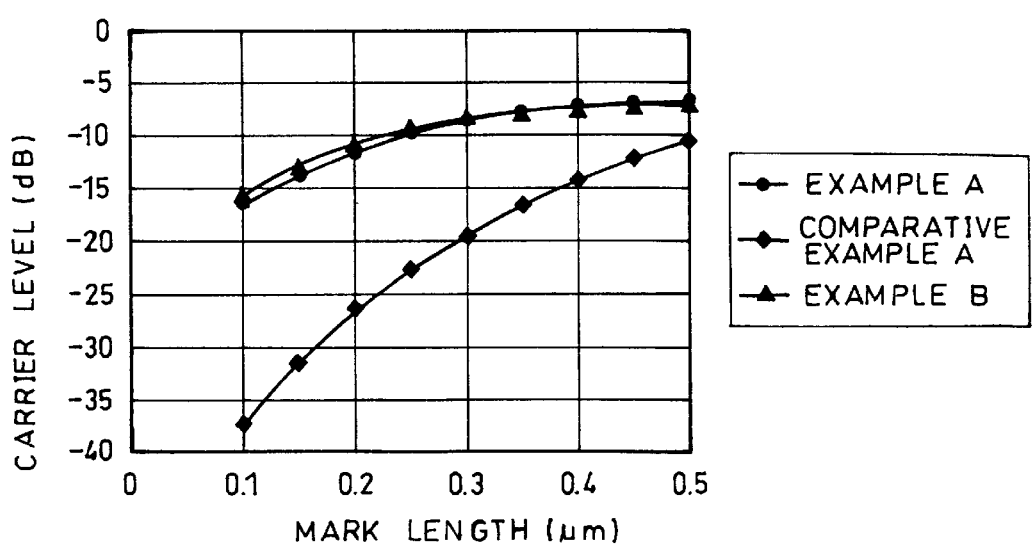
FIG. 11 is a graph showing dependence of a carrier level on a mark length, regarding one example of the magneto-optical disk.

Next, FIG. 11 is a graph showing a relationship between a carrier level and the mark length of the magneto-optical disk. In FIG. 11, Example B shows a dependence of a carrier level (signal intensity level) on the mark length regarding the magneto-optical disk having the above construction. The dependence is measured under a continuous irradiation of the recording/reproducing laser of 2.2 mW.

For comparison, FIG. 11 shows a dependence of a carrier level on the mark length regarding Example A and Comparative Example A. Here, Comparative Example A and Example A are evaluated in the recording and reproducing conditions which are described in the first embodiment.

The carrier level difference between Comparative Example A and Example A is described in the first embodiment. It is found that the carrier level of Example B is virtually the same as that of Example A. In the same manner as Example A, in Example B, a recording domain 8 is expanded and transferred to the reproducing layer 1, so that it is possible to obtain a relatively large carrier level as compared with that of Comparative Example A, and the carrier level can be reduced in a relatively gentle manner, when the mark length is shortened; consequently, a relatively large carrier level can be achieved even when the mark length is short.

As described above, the non-magnetic layer 14 is formed between the in-plane magnetic layer 2 and the recording layer 3 so as to relatively reduce the film thickness of the in-plane magnetic layer 2, and the reproducing layer 1 and the recording layer 3 are disposed more closely to each other, so that stronger magnetostatic coupling occurs therebetween; consequently, it is possible to reproduce a signal in a more stable manner and to record and reproduce a signal with a relatively low laser power.

[THIRD EMBODIMENT]

Referring to figures, the following explanation describes a third embodiment of the present invention. The present embodiment discusses a case in which a magneto-optical disk is adopted as a magneto-optical medium.

Figure 12:
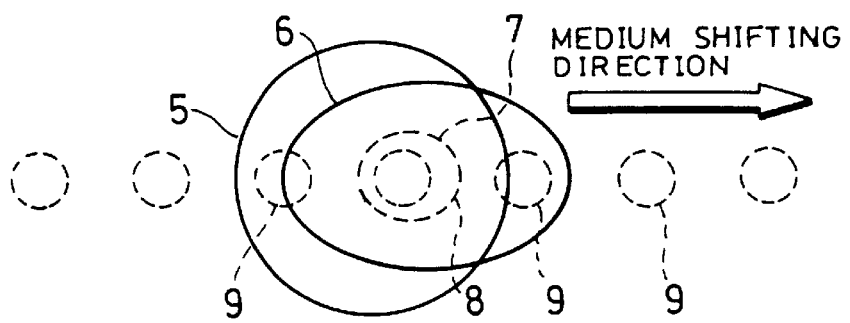
FIG. 12 is a plan diagram showing a reproducing operation of a magneto-optical disk of Embodiment 3.
Figure 13:
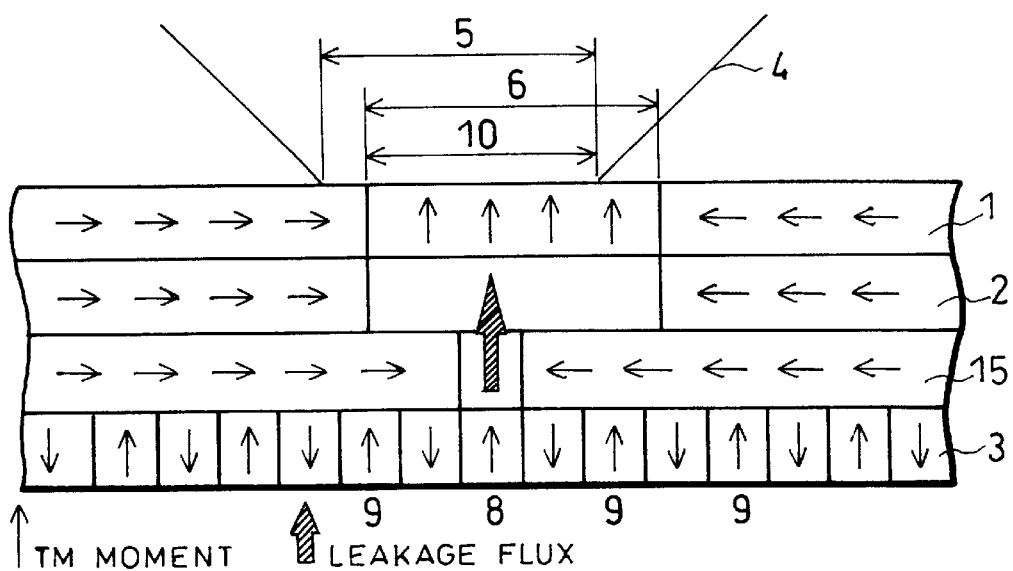
FIG. 13 is a sectional diagram showing the reproducing operation of the magneto-optical disk.

FIGS. 12 is a plan view showing a state of reproduction in accordance with a third embodiment. FIG. 13 is a cross section of the magneto-optical disk of FIG. 12. In the third embodiment, a second in-plane magnetic layer 15 is provided between an in-plane magnetic layer 2 and a recording layer 3 of the first embodiment shown in FIGS. 1 and 2. The second in-plane magnetic layer 15 has a Curie temperature which is higher than that of the in-plane magnetic layer 2 and is lower than that of the recording layer 3.

In the first embodiment, leakage flux appearing in the recording layer 3 and the reproducing layer 1 need to be magnetostatically coupled to each other in a coupling temperature area 7 so as to expand and reproduce a domain, which is transferred to the reproducing layer 1, in a reproducing temperature area 6. However, as shown in FIG. 6, total magnetization of the recording layer 3 gradually increases while the temperature rises to the coupling temperature area 7. Namely, leakage flux appearing in the recording layer 3 is maximized in the coupling temperature area 7; however, the leakage flux appears at lower than the coupling temperature area 7 as well. At a temperature lower than the coupling temperature area 7, the reproducing layer 1 and the recording layer 3 are magnetostatically coupled to each other so as to prevent a stable expansion and reproduction in the reproducing temperature area 6, resulting in degradation in quality of a reproduction signal.

As shown in FIG. 13, in the third embodiment, the second in-plane magnetic layer 15 is provided so as to have a temperature higher than the Curie temperature in the coupling temperature area 7; thus, it is possible to regulate leakage flux appearing at lower than the coupling temperature area 7. Further, leakage flux appearing in the recording layer 3 is magnetostatically coupled to the reproducing layer 1 merely in the coupling temperature area 7, so that it is possible to stably expand and reproduce a domain in the reproducing temperature area 6 of the reproducing layer 1.

Figure 14:
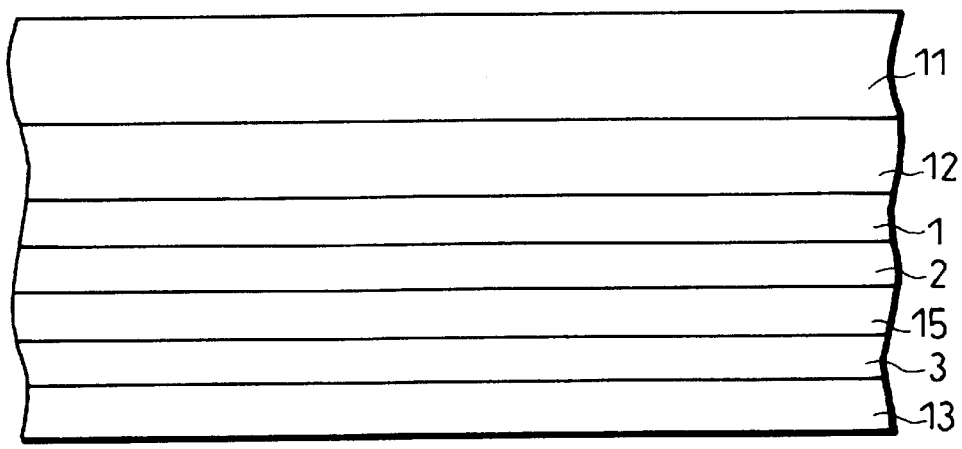
FIG. 14 is a sectional view schematically showing the magneto-optical disk.

As shown in FIG. 14, the magneto-optical disk of the present invention has a construction in which a transparent dielectric protecting layer 12, the reproducing layer 1, the in-plane magnetic layer 2, the second in-plane magnetic layer 15, the recording layer 3, and the protecting layer 13 are successively formed on a magneto-optical disk substrate 11.

As for the transparent dielectric protecting layer 12, the reproducing layer 1, the in-plane magnetic layer 2, the recording layer 3, and the protecting layer 13 of the third embodiment, it is possible to adopt the materials used in the first embodiment.

The second in-plane magnetic layer 15 has a magnetic film made of an alloy of rare earth transition metals. The Curie temperature is set higher than that of the in-plane magnetic layer 2 and lower than those of the reproducing layer 1 and the recording layer 3. It is desirable to set a Curie temperature Tc15 of the second in-plane magnetic layer 15 between 100° C. and 220° C. In the case of Tc2<100° C., the Curie temperature of the second in-plane magnetic layer 15 is lowered and the magnetization of the second in-plane magnetic layer 15 is reduced, so that it becomes difficult to regulate leakage flux appearing in the recording layer 3 at lower than the coupling temperature area 7; consequently, property of stably expanding and reproducing a domain is not expected to improve. In the case of Tc1>220° C., the Curie temperature of the second in-plane magnetic layer 15 becomes closer to that of the recording layer 3, so that leakage flux appearing in the recording layer 3 is regulated until at a relatively high temperature. Therefore, magnetostatic coupling force extremely becomes small between the reproducing layer 1 and the recording layer 3 in the coupling temperature area 7, so that a recording domain is unstably transferred to the reproducing layer 1, resulting in degradation in quality of a reproduction signal.

Moreover, as for the film thickness of the in-plane magnetic layer 2 and the second in-plane magnetic layer 15, it is desirable to set the film thickness of the in-plane magnetic layer 2 at 5 nm or more, the film thickness of the second in-plane magnetic layer 15 at 40 nm or more, and the total film thickness of the in-plane magnetic layer 2 and the second in-plane magnetic layer 15 at 80 nm or less. When the film thickness of the second in-plane magnetic layer 15 is less than 40 nm, exchange coupling force appearing in the recording layer 3 makes it difficult to maintain stable in-plane magnetization in the second in-plane magnetic layer 15, so that it is not possible to effectively regulate leakage flux appearing in the recording layer 3 at lower than the coupling temperature area 7; consequently, property of expanding and reproducing a domain is not expected to improve. Further, when the film thickness of the in-plane magnetic layer 2 is less than 5 nm, due to magnetic coupling between the reproducing layer 1 and the second in-plane magnetic layer 15, it becomes difficult to stably control the Curie temperature of the in-plane magnetic layer 2. Namely, between the reproducing layer 1 and the second in-plane magnetic layer 15 whose Curie temperatures are higher, the in-plane magnetic layer 2 having an extremely small film thickness is sandwiched so as to increase the Curie temperature of the in-plane magnetic layer 2 and to narrow the reproducing temperature area 6, resulting in a decline in intensity of a reproduction signal. Moreover, when the total film thickness of the in-plane magnetic layer 2 and the second in-plane magnetic layer 15 is more than 80 nm, recording sensitivity is considerably degraded due to an increase in the film thickness.

As the second in-plane magnetic layer 15 satisfying the above-mentioned condition, it is possible to adopt an in-plane magnetic film which is made of materials selected from: GdFe and GdFeCo, or GdFeD or GdFeCoD(D is made of one or more elements selected from Y, Ti, V, Cr, Pd, Cu, Si, and Al), and GdHRFe, GdHRFeCo, or GdHRFeCoD(HR is a heavy rare earth metal, and is made of one or more elements selected from Tb, Dy, Ho, and Er, and D is made of one or more elements selected from Y, Ti, V, Cr. Pd, Cu, Si, and Al), and GdLRFe, GdLRFeCo, or GdLRFeCoD(LR is a light rare earth metal, and is made of one or more elements selected from Ce, Pr, Nd, and Sm, and D is made of one or more elements selected from Y, Ti, V, Cr, Pd, Cu, Si, and Al).

Additionally, with this arrangement, a thermal dispersion metal layer, which is made of materials selected from Al, AlTa, AlTi, AlCr, AlNi, AlCo, and Cu, can be further added, so that it is possible to improve a thermal property of the medium. Further, in some cases, an ultraviolet cure resin, a heat cure resin, or a lubricant layer can be formed on the protecting layer 13 or the thermal dispersion metal layer.

Moreover, in order to record in a low magnetic field, at a position being contact with the recording layer 3, it is also possible to stack and form an auxiliary recording layer having a perpendicularly magnetized film, which is made of materials selected from GdFeCo, GdTbFeCo, and GdDyFeCo. The perpendicularly magnetized film has a smaller coercivity and a higher Curie temperature as compared with the recording layer 3.

EXAMPLE 3

Next, the following explanation describes a specific example of a method for forming a magneto-optical disk having such a construction, and a method for reproducing a record.

(1) A Forming Method of the Magneto-optical Disk

The following explanation describes a forming method of the magneto-optical disk having the above-mentioned construction.

Firstly, a substrate 11, which is made of a polycarbonate formed into a disk so as to include a land and a groove, is disposed in a sputtering device which is provided with an AlSi alloy target, a GdFeCo alloy target, a GdFeSi alloy target, a GdFe alloy target, and a TbFeCo alloy target. Further, after the inside of the sputtering device has been evacuated to $1\times10^{-6}$ Torr, a mixed gas of argon and nitrogen is filled therein, electricity is applied to the AlSi alloy target so as to form a transparent dielectric protecting layer 12 made of AlSiN with a thickness of 80 nm on the substrate 11, under the condition of a gas pressure of $4\times10^{-3}$ Torr.

Next, after the inside of the sputtering device has been evacuated to $1\times10^{-6}$ Torr again, a gas of argon is filled therein, electricity is applied to the GdFeCo alloy target so as to form a reproducing layer 1 made of $Gd_{0.25}(Fe_{0.88}Co_{0.12})_{0.75}$ with a film thickness of 40 nm on the transparent dielectric protecting layer 12, under the condition of a gas pressure of $4\times10^{-3}$ Torr. The reproducing layer 1 is a perpendicularly magnetized film having a compensation temperature of 0° C. and a Curie temperature of 280° C. And then, merely the reproducing layer 1 is made into a film, a protecting film is formed, and the magnetization is examined. As a result, it is found that the reproducing layer 1 is a perpendicularly magnetized film which continuously has perpendicular magnetization with regard to the film surface from room temperature to the Curie temperature.

And then, successively, electricity is applied to the GdFeSi alloy target so as to form an in-plane magnetic layer 2 made of $(Gd_{0.37}Fe_{0.63})_{0.80}Si_{0.20}$ with a film thickness of 10 nm on the reproducing layer 1, under the condition of a gas pressure of $4\times10^{-3}$ Torr. The in-plane magnetic layer 2 is an in-plane magnetic film having a Curie temperature of 80° C. and continuously has horizontal magnetization with regard to the film surface from room temperature to the Curie temperature.

Next, successively, electricity is applied to the GdFe alloy target so as to form a second in-plane magnetic layer 15 made of $Gd_{0.13}Fe_{0.87}$ with a film thickness of 50 nm on the in-plane magnetic layer 2, under the condition of a gas pressure of $4\times10^{-3}$ Torr. The second in-plane magnetic layer 15 is an in-plane magnetic film having a Curie temperature of 140° C. and continuously has horizontal magnetization with regard to the film surface from room temperature to the Curie temperature.

And then, successively, electricity is applied to the TbFeCo alloy target so as to form a recording layer 3 made of $Tb_{0.26}(Fe_{0.84}Co_{0.16})_{0.74}$ with a film thickness of 60 nm on the second in-plane magnetic layer 15, under the condition of a gas pressure of $4\times10^{-3}$ Torr. The recording layer 3 is a perpendicularly magnetized film having a compensation temperature of 50° C. and a Curie temperature of 260° C., and continuously has perpendicular magnetization with regard to the film surface from room temperature to the Curie temperature.

Next, a mixed gas of argon and nitrogen is filled therein, electricity is applied to the AlSi alloy target so as to form a protection layer 13 made of AlSiN with a film thickness of 20 nm on the recording layer 3, under the condition of a gas pressure of $4\times10^{-3}$ Torr.

And then, in a state in which the transparent dielectric protecting layer 12, the reproducing layer 1, the in-plane magnetic layer 2, the second in-plane magnetic layer 15, the recording layer 3, and the protecting layer 13 are stacked, the magnetization of the reproducing layer 1 is examined. As a result, it is confirmed that these layers continuously have in-plane magnetization from room temperature to the Curie temperature of the in-plane magnetic layer 2 and have perpendicular magnetization at more than the Curie temperature of the in-plane magnetic layer 2.

(2) Recording and Reproducing Property

The following explanation describes an evaluation result, in which the magneto-optical disk is evaluated by using a magneto-optical pickup which adopts a semiconductor laser having a wavelength of 680 nm, under the condition of a linear speed of 2.5 m/s.

Firstly, a recording magnetic field is modulated at ±15 kA/m under a continuous irradiation of a recording/reproducing laser of 6 mW, so that repeated patterns of upward magnetization and downward magnetization are formed on the recording layer 3 in accordance with the direction of the recording magnetic field. Further, a modulation frequency is changed on the recording magnetic field, so that a domain pattern having a mark length between 0.1 and 0.5 μm is recorded. Here, the mark length means that the recording domain whose length corresponds to the mark length is formed with a pitch which is twice as long as the mark length.

Figure 15:
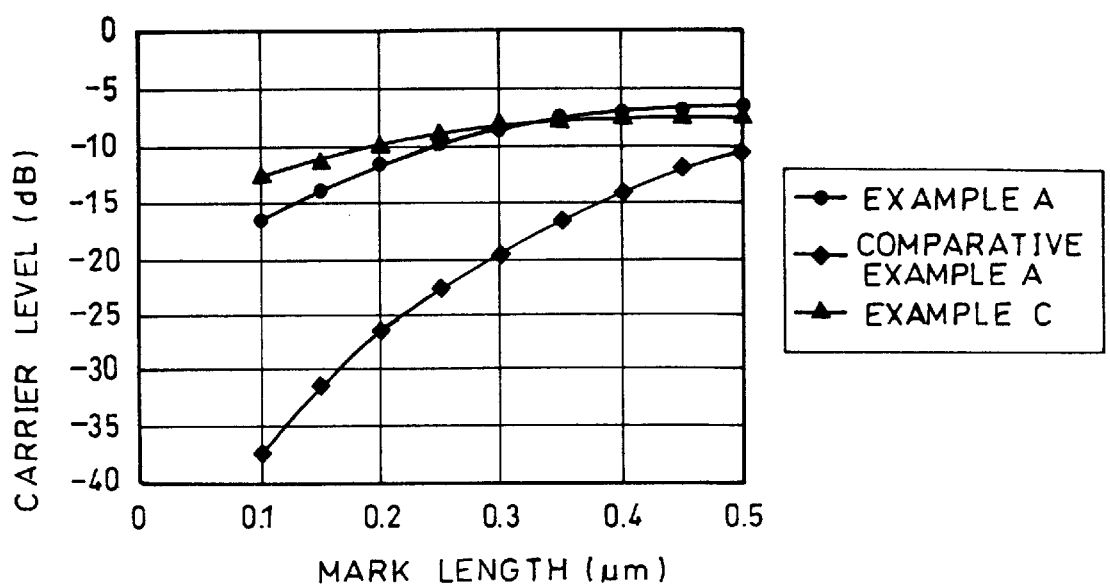
FIG. 15 is a graph showing dependence of a carrier level on a mark length, regarding one example of the magneto-optical disk.

FIG. 15 is a graph showing a relationship between a carrier level and the mark length of the magneto-optical disk. As Example C, FIG. 15 shows a dependence of a carrier level (signal intensity level) on the mark length regarding the magneto-optical disk having the above construction. The dependence is measured under a continuous irradiation of the recording/reproducing laser of 2.2 mW.

For comparison, FIG. 15 shows a dependence of carrier levels of Example A and Comparative Example A on the mark length. Here, Comparative Example A and Example A are evaluated in the recording and reproducing conditions which are described in the first embodiment.

The carrier level difference between Comparative Example A and Example A is described in the first embodiment. As with Example C, it is found that the carrier level of Example C is higher than that of Comparative Example A and a domain is expanded and reproduced in the same manner of Example A. Further, when Example C is compared with Example A, it is found that a higher carrier level is obtained at a shorter mark length. For example, at a mark length of 0.1 μm, the carrier level of Example C is higher than that of Example A by 4 dB. This is resulted from the fact that: the second in-plane magnetic layer 15 regulates leakage flux appearing at a temperature lower than a coupling temperature area 7; a magnetostatic coupling is strongly provided between leakage flux appearing in the recording layer 3 and the reproducing layer 1 merely in the coupling temperature area 7; and a domain is stably expanded and reproduced in a reproducing temperature area 6 of the reproducing layer 1 so as to realize a stable expansion and reproduction of a domain at shorter mark lengths.

[FOURTH EMBODIMENT]

Referring to figures, the following explanation describes a fourth embodiment of the present invention. The present embodiment discusses a case in which a magneto-optical disk is adopted as a magneto-optical medium.

Figure 16:
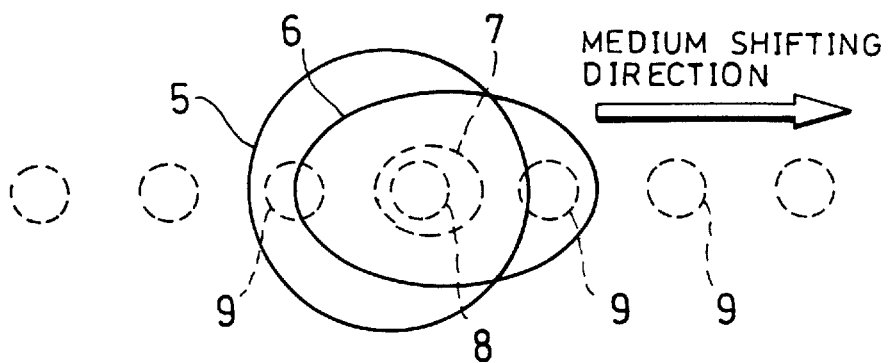
FIG. 16 is a plan diagram showing a reproducing operation performed in a magneto-optical disk of Embodiment 4.
Figure 17:
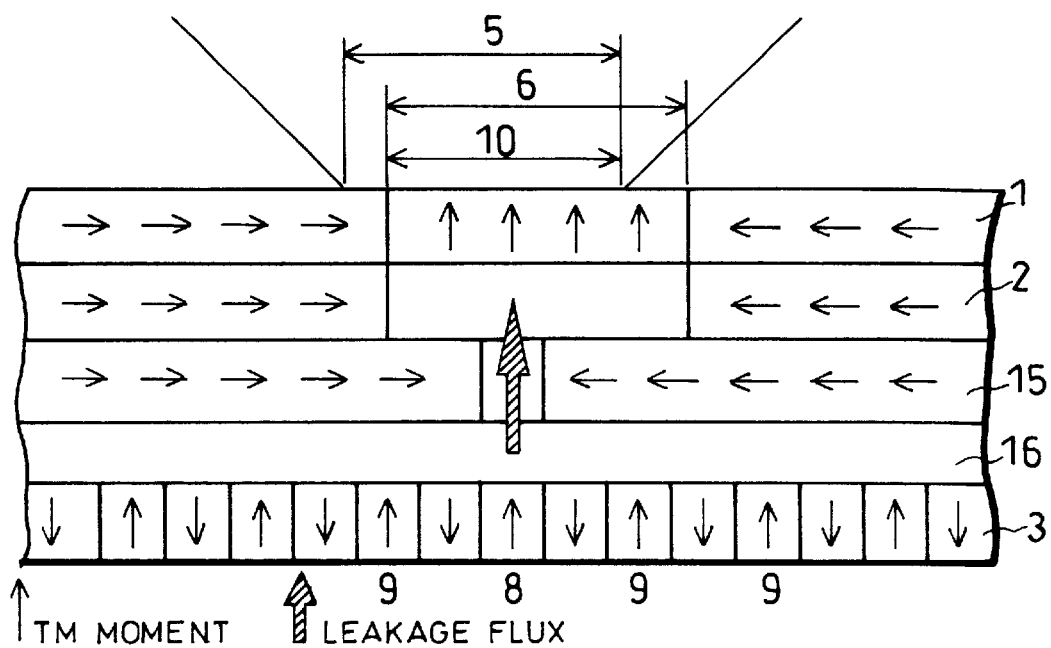
FIG. 17 is a sectional diagram showing the reproducing operation of the magneto-optical disk.

FIG. 16 is a plan view showing a state of reproduction in accordance with the fourth embodiment. FIG. 17 is a cross section of the magneto-optical disk of FIG. 16. In the fourth embodiment, a non-magnetic layer 16 is provided between a second in-plane magnetic layer 15 and a recording layer 3 of the third embodiment shown in FIGS. 12 and 13.

A recording domain 8, which is formed in the recording layer 3, is expanded and transferred to a reproducing layer 1 and is reproduced by a light beam 4. This principle is the same as that of the third embodiment.

In the fourth embodiment, the non-magnetic layer 16 is formed so as to completely shield an exchange coupling between the second in-plane magnetic layer 15 and the recording layer 3; therefore, even in the case of the second in-plane magnetic layer 15 having a smaller film thickness, it is possible to stably maintain in-plane magnetization in the second in-plane magnetic layer 15. Further, it is possible to more effectively regulate leakage flux appearing in the recording layer 3 at a temperature lower than the coupling temperature area 7 and to strongly provide a magnetostatic coupling between the leakage flux appearing in the recording layer 3 and the reproducing layer 1 merely in the coupling temperature area 7; consequently, stable expansion and reproduction of a domain can be realized in the reproducing temperature area 6 of the reproducing layer 1.

Figure 18:
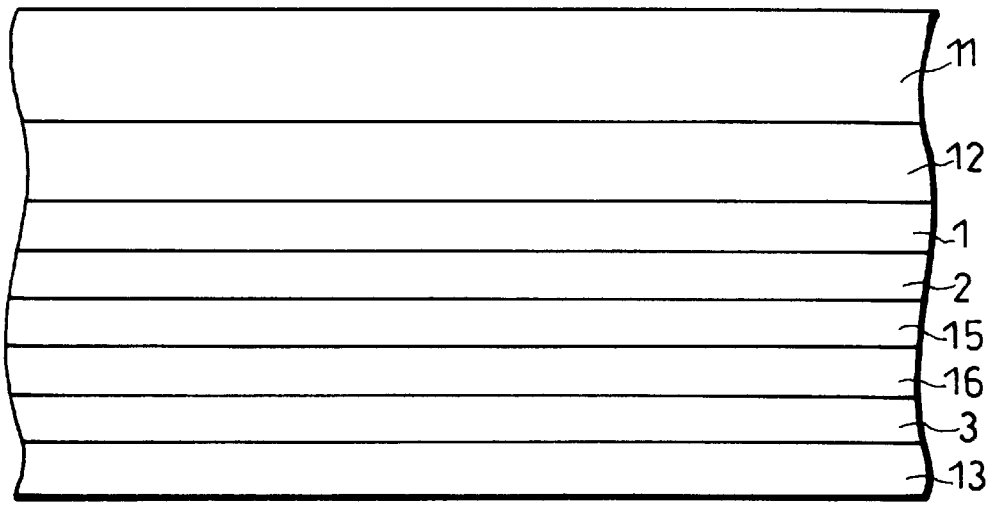
FIG. 18 is a sectional view schematically showing the construction of the magneto-optical disk.

As shown in FIG. 18, the magneto-optical disk of the present invention has a construction in which a transparent dielectric protecting layer 12, the reproducing layer 1, the in-plane magnetic layer 2, the second in-plane magnetic layer 15, the non-magnetic layer 16, the recording layer 3, and the protecting layer 13 are successively formed on a magneto-optical disk substrate 11.

As for the transparent dielectric protecting layer 12, the reproducing layer 1, the in-plane magnetic layer 2, the second in-plane magnetic layer 15, the recording layer 3, and the protecting layer 13 of the fourth embodiment, it is possible to adopt the same materials as those of the third embodiment. Additionally, in the fourth embodiment, the non-magnetic layer 16 shields the exchange coupling between the second in-plane magnetic layer 15 and the recording layer 3, so that a film thickness of the second in-plane magnetic layer 15 can be smaller than that of the third embodiment.

In the fourth embodiment, as for the film thickness of the in-plane magnetic layer 2 and the second in-plane magnetic layer 15, it is desirable to set the film thickness of the in-plane magnetic layer 2 at 5 nm or more, the film thickness of the second in-plane magnetic layer 15 at 5 nm or more, and the total film thickness of the in-plane magnetic layer 2 and the second in-plane magnetic layer 15 at 80 nm or less. When the film thickness of the second in-plane magnetic layer 15 is less than 5 nm, it becomes difficult to effectively regulate leakage flux appearing in the recording layer 3 at a temperature lower than the coupling temperature area 7; consequently, property of expanding and reproducing a domain is not expected to improve. Further, when the film thickness of the in-plane magnetic layer 2 is less than 5 nm, due to magnetic coupling between the reproducing layer 1 and the second in-plane magnetic layer 15, it becomes difficult to stably control the Curie temperature of the in-plane magnetic layer 2. Namely, between the reproducing layer 1 and the second in-plane magnetic layer 15 whose Curie temperatures are higher, the in-plane magnetic layer 2 having an extremely thin film thickness is sandwiched so as to increase the Curie temperature of the in-plane magnetic layer 2. Therefore, the reproducing temperature area 6 is narrowed, resulting in a decline in intensity of a reproduction signal. Moreover, when the total film thickness of the in-plane magnetic layer 2 and the second in-plane magnetic layer 15 is more than 80 nm, recording sensitivity is considerably degraded due to an increase in the film thickness.

The non-magnetic layer 16 has a transparent dielectric, which is made of materials selected from AlN, SiN, AlSiN, and $Ta_2O_3$, or has an alloy of non-magnetic metals, which are made of metals selected from Al, Ti, Ta, and Ni. The non-magnetic layer 16 is formed in order to shield the exchange coupling between (a)the reproducing layer 1 and the in-plane magnetic layer 2 and (b)the second in-plane magnetic layer 15 and the recording layer 3. It is desirable to set the film thickness at between 0.5 and 40 nm. When the film thickness of the non-magnetic layer 16 is less than 0.5 nm, it becomes difficult to stably shield the exchange coupling between the reproducing layer 1 and the in-plane magnetic layer 2 and the second in-plane magnetic layer 15 and the recording layer 3, resulting in degradation in quality of a reproduction signal. Moreover, when the film thickness of the non-magnetic layer 16 is more than 40 nm, a distance between the reproducing layer 1 and the recording layer 3 becomes too large; thus, it becomes difficult to maintain a stable magnetostatic coupling between the reproducing layer 1 and the recording layer 3, resulting in degradation in quality of the reproduction signal.

Additionally, with this arrangement, a thermal dispersion metal layer, which is made of materials selected from Al, AlTa, AlTi, AlCr, AlNi, AlCo, and Cu, can be further added, so that it is possible to improve a thermal property of the medium. Further, in some cases, an ultraviolet cure resin, a heat cure resin, or a lubricant layer can be formed on the protecting layer 13 or the thermal dispersion metal layer.

Moreover, in order to record in a low magnetic field, at a position being contact with the recording layer 3, it is also possible to stack and form an auxiliary recording layer 24 made of a perpendicularly magnetized film, which is made of materials selected from GdFeCo, GdTbFeCo, and GdDyFeCo. The perpendicularly magnetized film has a smaller coercivity and a higher Curie temperature as compared with the recording layer 3.

EXAMPLE 4

Next, the following explanation describes a specific example of a method for forming a magneto-optical disk having such a construction, and a method for reproducing a record.

(1) A Forming Method of the Magneto-optical Disk

The following explanation describes a forming method of the magneto-optical disk having the above-mentioned construction.

Firstly, a substrate 11, which is made of a polycarbonate formed into a disk so as to include a land and a guide, is disposed in a sputtering device which is provided with an AlSi alloy target, a GdFeCo alloy target, a GdFeSi alloy target, a GdFe alloy target, and a TbFeCo alloy target. Further, after the inside of the sputtering device has been evacuated to $1 \times 10^{-6}$ Torr, a mixed gas of argon and nitrogen is filled therein, electricity is applied to the AlSi alloy target so as to form a transparent dielectric protecting layer 12 made of AlSiN with a film thickness of 80 nm on the substrate 11, under the condition of a gas pressure of $4 \times 10^{-3}$ Torr.

Next, after the inside of the sputtering device has been evacuated to $1 \times 10^{-6}$ Torr again, a gas of argon is filled therein, electricity is applied to the GdFeCo alloy target so as to form a reproducing layer 1 made of $Gd_{0.25}(Fe_{0.88}Co_{0.12})_{0.75}$ with a film thickness of 40 nm on the transparent dielectric protecting layer 12, under the condition of a gas pressure of $4 \times 10^{-3}$ Torr. The reproducing layer 1 is a perpendicularly magnetized film having a compensation temperature of 0° C. and a Curie temperature of 280° C. And then, merely the reproducing layer 1 is made into a film, a protecting film is formed, and the magnetization is examined. As a result, it is found that the reproducing layer 1 is a perpendicularly magnetized film which continuously has perpendicular magnetization with regard to the film surface from room temperature to the Curie temperature.

And then, successively, electricity is applied to the GdFeSi alloy target so as to form an in-plane magnetic layer 2 made of $(Gd_{0.37}Fe_{0.63})_{0.80}Si_{0.20}$ with a film thickness of 10 nm on the reproducing layer 1, under the condition of a gas pressure of $4 \times 10^{-3}$ Torr. The in-plane magnetic layer 2 is an in-plane magnetic film having a Curie temperature of 80° C. and continuously has horizontal magnetization with regard to the film surface from room temperature to the Curie temperature.

Next, successively, electricity is applied to the GdFe alloy target so as to form a second in-plane magnetic layer 15 made of $Gd_{0.13}Fe_{0.87}$ on the in-plane magnetic layer 2 with a film thickness of 20 nm, under the condition of a gas pressure of $4\times10^{-3}$ Torr. The second in-plane magnetic layer 15 is an in-plane magnetic film having a Curie temperature of 140° C. and continuously has horizontal magnetization with regard to the film surface from room temperature to the Curie temperature.

Next, a mixed gas of argon and nitrogen is filled therein, electricity is applied to the AlSi alloy target so as to form a non-magnetic layer 16 made of AlSiN with a film thickness of 5 nm on the second in-plane magnetic layer 15, under the condition of a gas pressure of $4\times10^{-3}$ Torr.

And then, successively, electricity is applied to the TbFeCo alloy target so as to form a recording layer 3 made of $Tb_{0.26}(Fe_{0.84}Co_{0.16})_{0.74}$ with a film thickness of 60 nm on the non-magnetic layer 16, under the condition of a gas pressure of $4\times10^{-3}$ Torr. The recording layer 3 is a perpendicularly magnetized film having a compensation temperature of 50° C. and a Curie temperature of 260° C., and continuously has perpendicular magnetization with regard to the film surface from room temperature to the Curie temperature.

Next, a mixed gas of argon and nitrogen is filled therein, electricity is applied to the AlSi alloy target so as to form a protecting layer 13 made of AlSiN with a film thickness of 20 nm on the recording layer 3, under the condition of a gas pressure of $4\times10^{-3}$ Torr.

And then, in a state in which the transparent dielectric protecting layer 12, the reproducing layer 1, the in-plane magnetic layer 2, the second in-plane magnetic layer 15, the non-magnetic layer 16, the recording layer 3, and the protecting layer 13 are stacked, the magnetization of the reproducing layer 1 is examined. As a result, it is confirmed that the reproducing layer 1 continuously has in-plane magnetization from room temperature to the Curie temperature of the in-plane magnetic layer 2, and have perpendicular magnetization at more than the Curie temperature of the in-plane magnetic layer 2.

(2) Recording and Reproducing Property

The following explanation describes an evaluation result, in which the magneto-optical disk is evaluated by using a magneto-optical pickup which adopts a semiconductor laser having a wavelength of 680 nm, under the condition of a linear speed of 2.5 m/s.

Firstly, a recording magnetic field is modulated at ±15 kA/m under a continuous irradiation of a recording/reproducing laser of 5.6 mW, so that repeated patterns of upward magnetization and downward magnetization are formed on the recording layer 3 in accordance with the direction of the recording magnetic field. Further, a modulation frequency is changed on the recording magnetic field, so that a domain pattern having a mark length between 0.1 and 0.5 μm is recorded. Here, the mark length means that the recording domain whose length corresponds to the mark length is formed with a pitch which is twice as long as the mark length.

Figure 19:
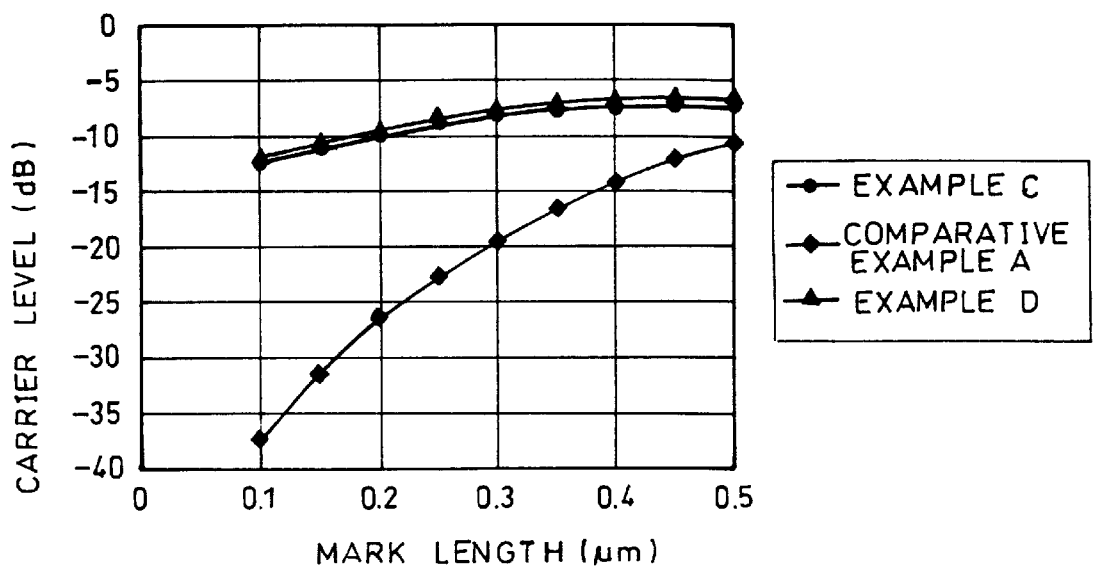
FIG. 19 is a graph showing dependence of a carrier level on a mark length, regarding one example of the magneto-optical disk.

FIG. 19 is a graph showing a relationship between a carrier level and the mark length of the magneto-optical disk. As Example D, FIG. 19 shows a dependence of a carrier level (signal intensity level) on the mark length. The dependence is measured under a continuous irradiation of the recording/reproducing laser of 2.3 mW.

For comparison, FIG. 19 shows a dependence of carrier levels of Example C and Comparative Example A on the mark length. Here, Comparative Example A and Example C are evaluated in the recording and reproducing conditions, which are described in the first and third embodiments.

The carrier level difference between Comparative Example A and Example C is described in the third embodiment. It is found that the carrier level of Example D is virtually the same as that of Example C. In the same manner as Example C, in Example D, a recording domain 8 is expanded and transferred to the reproducing layer 1, so that it is possible to obtain a relatively large carrier level as compared with that of Comparative Example A, and the carrier level can be reduced in a relatively gentle manner, as the mark length becomes shorter; consequently, a relatively large carrier level can be achieved even when the mark length is short.

As described above, the non-magnetic layer 16 is formed between the second in-plane magnetic layer 15 and the recording layer 3 so as to relatively reduce the film thickness of the second in-plane magnetic layer 15, and the reproducing layer 1 and the recording layer 3 are disposed more closely to each other, so that stronger magnetostatic coupling occurs therebetween; consequently, it is possible to reproduce a signal in a more stable manner and to record and reproduce a signal with a relatively low laser power.

[FIFTH EMBODIMENT]

Figure 20:
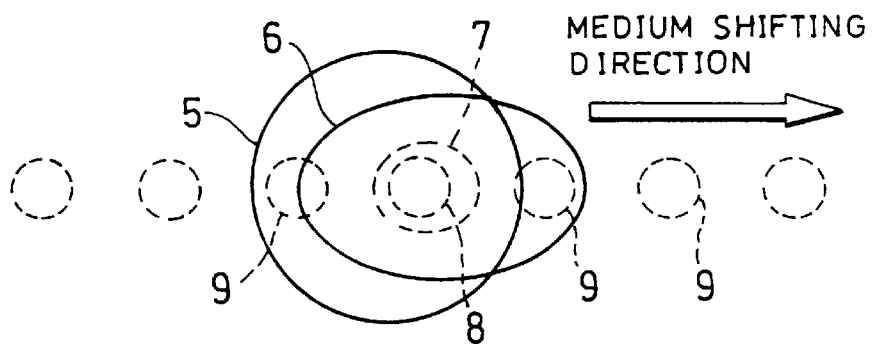
FIG. 20 is a plan diagram showing a reproducing operation of a magneto-optical disk of Embodiment 5.
Figure 21:
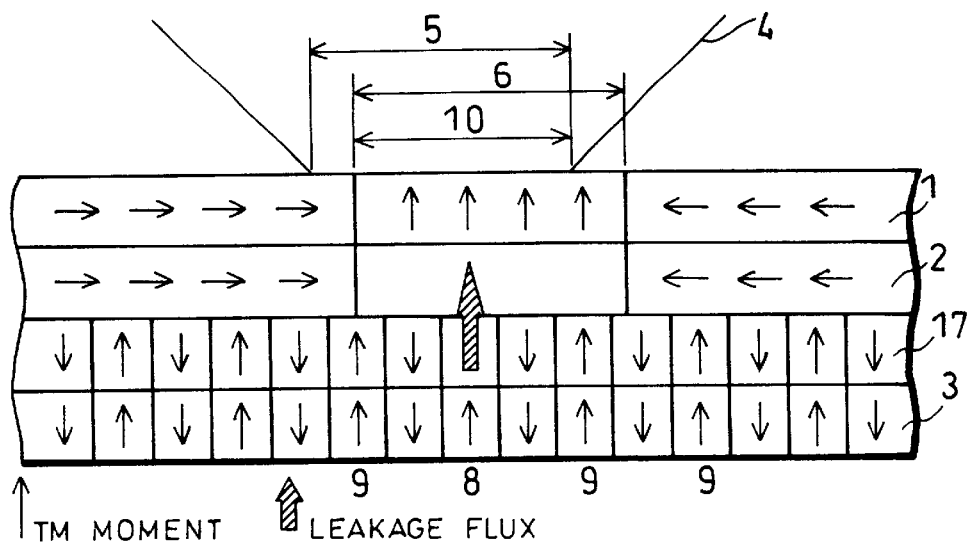
FIG. 21 is a sectional diagram showing the reproducing operation of the magneto-optical disk.
Figure 22:
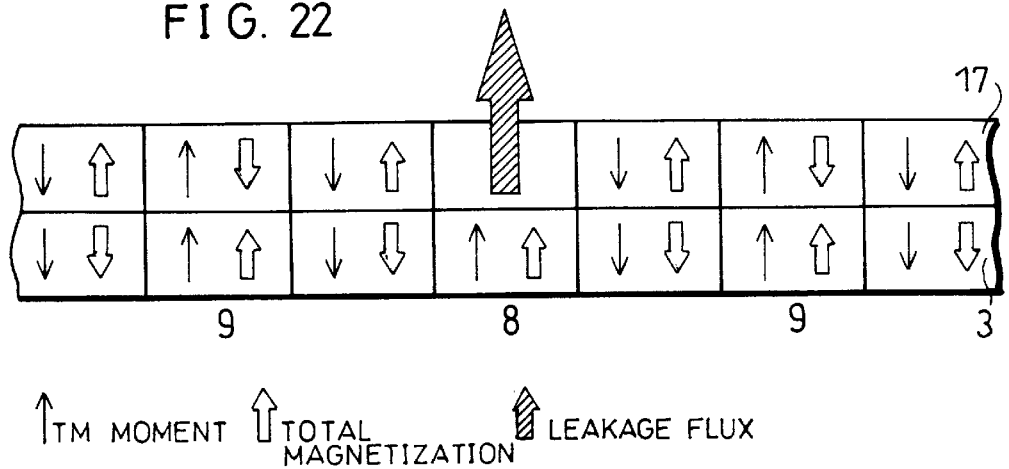
FIG. 22 is a sectional diagram showing leakage flux appearing in the magneto-optical disk.

Referring to FIGS. 20 through 22, the following explanation fully describes a magneto-optical recording medium of a fifth embodiment of the present invention.

In the magneto-optical disk of the first and second embodiments, a reproducing layer 1 is magnetostatically coupled to leakage flux, which appears in a recording layer 3, in a coupling temperature area 7 so as to realize expansion and reproduction of a domain. In the third and fourth embodiments, a second in-plane magnetic layer 15 is used for regulating leakage flux which appears in the recording layer 3 at a temperature lower than a coupling temperature area 7 so as to realize a more stable expansion and reproduction of a domain in the reproducing layer 1.

In the magneto-optical disk of the fifth embodiment, a flux adjusting layer 17 is stacked so as to be contact with the recording layer 3. The flux adjusting layer 17 has magnetic polarity which is different from that of the recording layer 3 and a Curie temperature which is lower than that of the recording layer 3. The magneto-optical recording medium of the present embodiment controls leakage flux appearing in the recording layer 3 and the flux adjusting layer 17 so as to regulate leakage flux appearing in the recording layer 3 and the flux adjusting layer 17 at a temperature lower than the coupling temperature area 7; consequently, it is possible to realize more stable expansion and reproduction of a domain in the reproducing layer 1.

FIG. 20 is a plan view showing a reproducing state of the magneto-optical disk of the fifth embodiment. FIG. 21 is a cross section of the magneto-optical disk shown in FIG. 20.

FIG. 22 is an expanded sectional view showing magnetization of merely the recording layer 3 and the flux adjusting layer 17 shown in FIG. 21. In FIG. 22, the flux adjusting layer 17 is made of a perpendicularly magnetized film which continuously maintains a RErich composition from room temperature to the Curie temperature, and TM moment and total magnetization are arranged in opposite directions. Meanwhile, the recording layer 3 is made of a perpendicularly magnetized film which continuously maintains a TMrich composition from room temperature to the Curie temperature, and the TM moment and total magnetization are arranged in the same direction.

Here, the flux adjusting layer 17 is stacked on the recording layer 3, so that an exchange coupling force allows the TM moment directions of both layers to be aligned in the same directions. In this case, the total magnetization of the flux adjusting layer 17 and the total magnetization of the recording layer 3 are arranged in the opposite directions.

Leakage flux appearing in the flux adjusting layer 17 and the recording layer 3 is the entire amount of the total magnetization thereof. Since the total magnetization of the flux adjusting layer 17 and the total magnetization of the recording layer 3 cancel each other, it is possible to realize a state in which little leakage flux exists. Meanwhile, at a temperature higher than the Curie temperature of the flux adjusting layer 17, the total magnetization of the flux adjusting layer 17 does not exist, so that leakage flux appears merely in the recording layer 3. Therefore, merely in the coupling temperature area 7, large leakage flux appears from the recording layer 3, so that it is possible to realize more stable expansion and reproduction of a domain in the reproducing layer 1.

Next, referring to figures, the following explanation describes a fifth embodiment of the present invention. The present embodiment discusses a case in which a magneto-optical disk is adopted as a magneto-optical recording medium.

Figure 23:
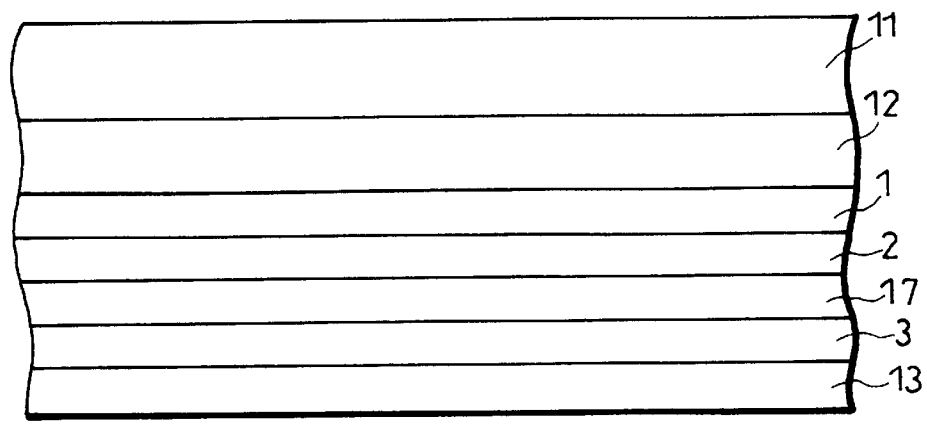
FIG. 23 is a sectional view schematically showing the construction of the magneto-optical disk.

As shown in FIG. 23, the magneto-optical recording medium of the present invention has a construction in which a transparent dielectric protecting layer 12, the reproducing layer 1, an in-plane magnetic layer 2, the flux adjusting layer 17, the recording layer 3, and a protecting layer 13 are successively formed on a magneto-optical disk substrate 11.

As for the magneto-optical disk substrate 11, the transparent dielectric protecting layer 12, the reproducing layer 1, the in-plane magnetic layer 2, and the protecting layer 15 of the fifth embodiment, it is possible to adopt the materials used in the first embodiment.

The flux adjusting layer 17 and the recording layer 3 are perpendicularly magnetized films made of alloys of rare earth transition metals. In order to allow strong leakage flux to appear from the recording layer 3 merely in the coupling temperature area 7, the Curie temperature of the flux adjusting layer 17 is set lower than that of the recording layer 3 and higher than that of the in-plane magnetic layer 2, and the flux adjusting layer 17 and the recording layer 3 are arranged so as to have different magnetic polarities. Namely, in the case when a perpendicularly magnetized film having a RErich composition made of an alloy of rare earth transition metals is adopted as the flux adjusting layer 17, it is necessary to adopt a perpendicularly magnetized film having a TMrich composition made of an alloy of rare earth transition metals as the recording layer 3; meanwhile, in the case when a perpendicularly magnetized film having a TMrich composition made of an alloy of rare-earth transition metals is adopted as the flux adjusting layer 17, it is necessary to adopt a perpendicularly magnetized film having a RErich composition made of an alloy of rare earth transition metals as the recording layer 3.

Here, when the in-plane magnetic layer 2, the recording layer 3, and the flux adjusting layer 17 have the Curie temperatures of Tc2, Tc3, and Tc17, at least Tc2<Tc17<Tc3 needs to be satisfied. Furthermore, it is desirable to set the Curie temperatures so as to satisfy a condition of (Tc3−120° C.≦Tc17≦Tc3−60° C.). In the case of Tc17<Tc3−120° C., due to a low Curie temperature of the flux adjusting layer 17, the total magnetization of the flux adjusting layer 17 is reduced, so that it is not possible to sufficiently adjust leakage flux appearing in the recording layer 3. Therefore, large leakage flux occurs across an area which is wider than the coupling temperature area 7 in the recording layer 3, resulting in degradation in quality of a reproduction signal when a mark length is short. Furthermore, in the case of Tc17>Tc3−60° C., the Curie temperature of the flux adjusting layer 17 is too high, so that leakage flux appearing in the recording layer 3 becomes too small in the coupling temperature area; thus, a recording domain 8 is unstably expanded and transferred from the recording layer 3 to the reproducing layer 1, resulting in degradation in quality of a reproduction signal.

Moreover, it is desirable to set the film thickness of the recording layer 3 at 30 nm or more, a film thickness of the flux adjusting layer 17 at 10 nm or more, and a total film thickness of the recording layer 3 and the flux adjusting layer 17 at 120 nm or less. When a film thickness of the recording layer 3 is less than 30 nm, leakage flux appearing in the recording layer 3 becomes small, so that it becomes difficult to maintain stable magnetostatic coupling between the reproducing layer 1 and the recording layer 3, resulting in degradation in quality of the reproduction signal. Further, when a film thickness of the flux adjusting layer 17 is less than 10 nm, due to a reduction in a film thickness of the flux adjusting layer 17, it is not possible to sufficiently adjust leakage flux appearing in the recording layer 3, resulting in degradation in quality of a reproduction signal when a mark length is short. Moreover, when the total film thickness of the recording layer 3 and the flux adjusting layer 17 is more than 120 nm, recording sensitivity is considerably degraded due to an increase in the film thickness.

As the recording layer 3 and the flux adjusting layer 17 that realize the above-mentioned magnetic property, it is possible to adopt a perpendicularly magnetized film which is made of materials selected from: TbFe, TbFeCo, DyFe, DyFeCo, TbDyFe, TbDyFeCo, TbFeD, TbFeCoD, DyFeD, DyFeCoD, TbDyFeD, and TbDyFeCoD(D is made of one or more elements selected from Y, Ti, V, Cr, Pd, Cu, Si, and Al).

In the present embodiment, it is merely necessary to have different magnetic polarities as for the recording layer 3 and the flux adjusting layer 17. The recording layer 3 and the flux adjusting layer 17 can be formed in reverse order to FIG. 23.

Additionally, a thermal dispersion metal layer, which is made of materials selected from Al, AlTa, AlTi, AlCr, AlNi, AlCo, and Cu, can be further added to this arrangement so that it is possible to improve a thermal property of the medium. Further, in some cases, an ultraviolet cure resin, a heat cure resin, or a lubricant layer may be formed on the protecting layer 15 or the thermal dispersion metal layer.

In order to record in a low magnetic field, at a position being contact with the recording layer 3, it is also possible to stack and form a perpendicularly magnetized film such as an auxiliary recording layer having a perpendicularly magnetized film, which is made of materials selected from GdFeCo, GdTbFeCo, and GdDyFeCo. The perpendicularly magnetized film has a higher Curie temperature as compared with the recording layer 3.

EXAMPLE 5

Next, the following explanation describes a specific example of a method for forming a magneto-optical disk having such a construction, and a method for reproducing a record.

(1) A Forming Method of the Magneto-optical Disk

The following explanation describes a forming method of the magneto-optical disk having the above-mentioned construction.

Firstly, a substrate 11, which is made of a polycarbonate formed into a disk so as to include a land and a groove, is disposed in a sputtering device which is provided with an Al alloy target, a GdFeCo alloy target, a GdFeSi alloy target, a TbDyFeCo alloy target, and a TbFeCo alloy target. Further, after the inside of the sputtering device has been evacuated to $1\times10^{-6}$ Torr, a mixed gas of argon and nitrogen is filled therein, electricity is applied to the Al alloy target so as to form a transparent dielectric protecting layer 12 made of AlN with a thickness of 80 nm on the substrate 11, under the condition of a gas pressure of $4\times10^{-3}$ Torr.

Next, after the inside of the sputtering device has been evacuated to $1\times10^{-6}$ Torr again, a gas of argon is filled therein, electricity is applied to the GdFeCo alloy target so as to form a reproducing layer 1 made of $Gd_{0.25}(Fe_{0.88}Co_{0.12})_{0.75}$ with a film thickness of 40 nm on the transparent dielectric protecting layer 12, under the condition of a gas pressure of $4\times10^{-3}$ Torr. The reproducing layer 1 is a perpendicularly magnetized film having a compensation temperature of 0° C. and a Curie temperature of 280° C. And then, merely the reproducing layer 1 is made into a film, a protecting film is formed, and the magnetization is examined. As a result, it is found that the reproducing layer 1 is a perpendicularly magnetized film which continuously has perpendicular magnetization with regard to the film surface from room temperature to the Curie temperature.

And then, successively, electricity is applied to the GdFeSi alloy target so as to form an in-plane magnetic layer 2 made of $(Gd_{0.37}Fe_{0.63})_{0.80}Si_{0.20}$ with a film thickness of 60 nm on the reproducing layer 1, under the condition of a gas pressure of $4\times10^{-3}$ Torr. The in-plane magnetic layer 2 is an in-plane magnetic film having a Curie temperature of 80° C. and continuously has horizontal magnetization with regard to the film surface from room temperature to the Curie temperature.

Next, successively, electricity is applied to the TbDyFeCo alloy target so as to form a flux adjusting layer 17 made of $(Tb_{0.5}Dy_{0.5})_{0.29}(Fe_{0.84}Co_{0.16})_{0.71}$ with a film thickness of 30 nm on the in-plane magnetic layer 2, under the condition of a gas pressure of $4\times10^{-3}$ Torr. The flux adjusting layer 17 is a perpendicularly magnetized film having a Curie temperature of 140° C. and continuously has an RErich composition from room temperature to the Curie temperature.

And then, successively, electricity is applied to the TbFeCo alloy target so as to form a recording layer 3 made of $Tb_{0.22}(Fe_{0.84}Co_{0.16})_{0.78}$ with a film thickness of 60 nm on the flux adjusting layer 17, under the condition of a gas pressure of $4\times10^{-3}$ Torr. The recording layer 3 is a perpendicularly magnetized film having a compensation temperature of 0° C. and a Curie temperature of 280° C., and the recording layer 3 continuously has a TMrich composition from room temperature to the Curie temperature.

Next, a mixed gas of argon and nitrogen is filled therein, electricity is applied to the Al alloy target so as to form a protecting layer 13 made of AlN with a film thickness of 20 nm on the recording layer 3, under the condition of a gas pressure of $4\times10^{-3}$ Torr.

And then, in a state in which the transparent dielectric protecting layer 12, the reproducing layer 1, the in-plane magnetic layer 2, the flux adjusting layer 17, the recording layer 3, and the protecting layer 13 are stacked, the magnetization of the reproducing layer 1 is examined. As a result, it is confirmed that the reproducing layer 1 continuously has in-plane magnetization from room temperature to the Curie temperature of the in-plane magnetic layer 2 and has perpendicular magnetization at more than the Curie temperature of the in-plane magnetic layer 2.

Figure 24:
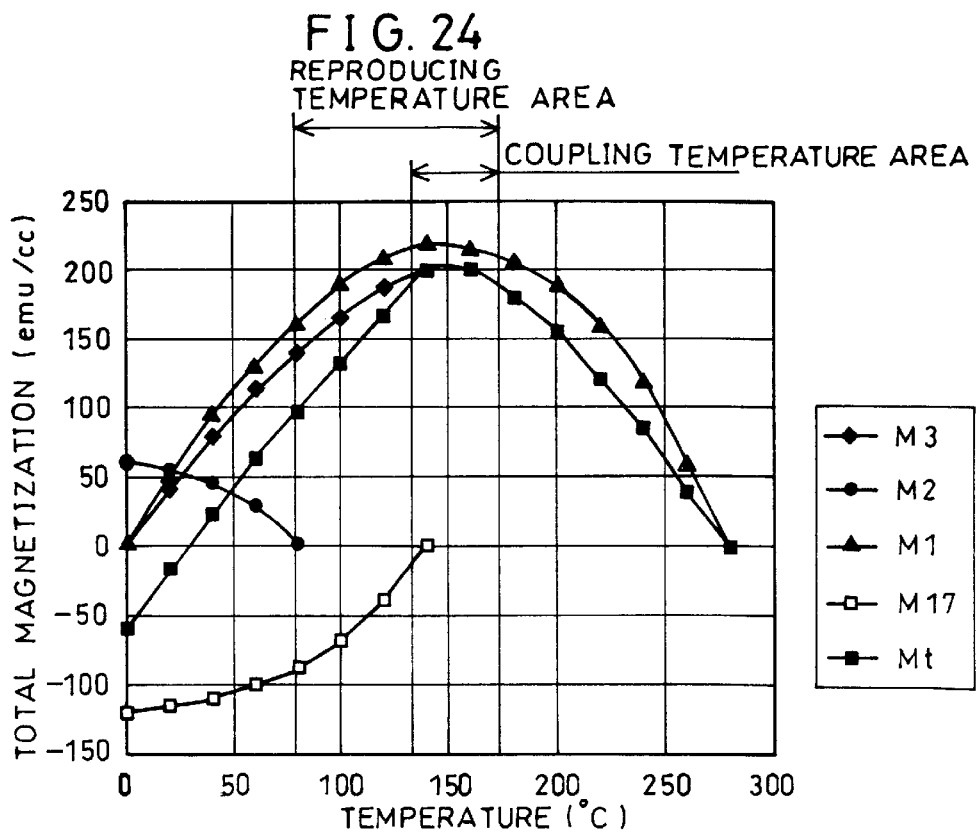
FIG. 24 is a graph showing dependence of total magnetization on temperature, regarding one example of the magneto-optical disk.

Further, FIG. 24 shows temperature dependence of total magnetization M17 of the flux adjusting layer 17, and temperature dependence of total magnetization M3 of the recording layer 3, and further, temperature dependence of Mt(Mt=M3+M17/2), which is equivalent to total magnetization in the case when the flux adjusting layer 17 and the recording layer 3 are stacked. Here, the flux adjusting layer 17 and the recording layer 3 have different magnetic polarities, so that the total magnetization directions are opposite to each other. Therefore, the total magnetization of the recording layer 3 is indicated in a positive value, and the total magnetization of the flux adjusting layer 17 is indicated in a negative value.

When Mt is compared with M3, the total magnetization of Mt increases more sharply in accordance with a temperature increased to the coupling temperature area 7. Namely, the flux adjusting layer 17 is provided so as to maintain strong magnetostatic coupling between the recording layer 3 and the reproducing layer 1 in the coupling temperature area 7. In an area whose temperature is lower than that of the coupling temperature area 7, the flux adjusting layer 17 makes it possible to accordingly reduce leakage flux which appears in the recording layer 3 and the flux adjusting layer 17, and to accordingly weaken magnetostatic coupling with the reproducing layer 1.

(2) Recording and Reproducing Property

The following explanation describes an evaluation result, in which the magneto-optical disk is evaluated by using a magneto-optical pickup which adopts a semiconductor laser having a wavelength of 680 nm, under the condition of a linear speed of 2.5 m/s.

Firstly, a recording magnetic field is modulated at ±15 kA/m under a continuous irradiation of a recording/reproducing laser of 6.5 mW, so that repeated patterns of upward magnetization and downward magnetization are formed on the recording layer 3 and the flux adjusting layer 17 in accordance with the direction of the recording magnetic field. Further, a modulation frequency is changed on the recording magnetic field, so that a domain pattern having a mark length between 0.1 and 0.5 $\mu$m is recorded. Here, the mark length means that the recording domain whose length corresponds to the mark length is formed with a pitch which is twice as long as the mark length.

Figure 25:
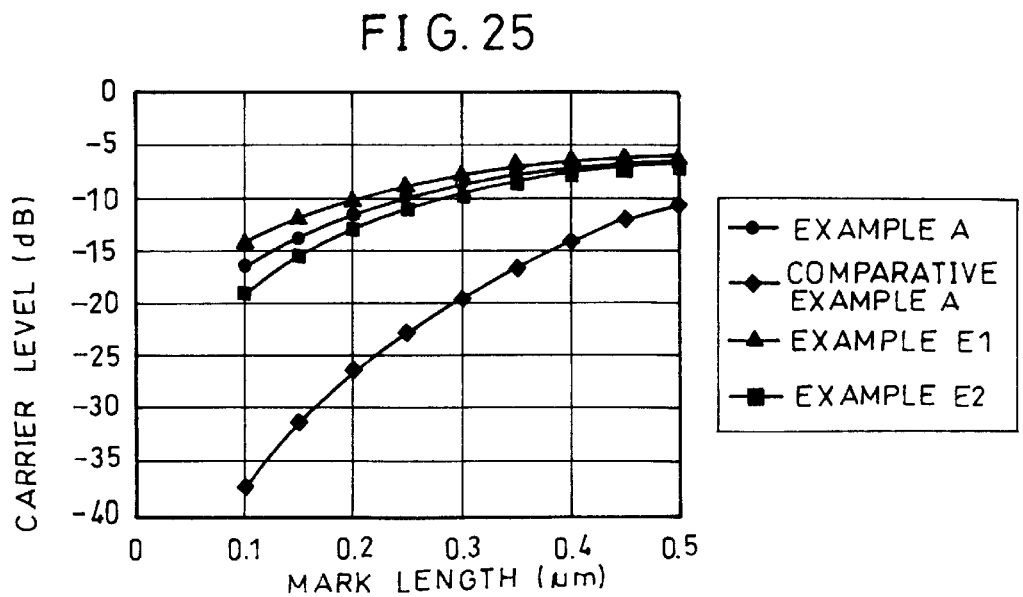
FIG. 25 is a graph showing dependence of a carrier level on a mark length, regarding the magneto-optical disk of the example.

FIG. 25 is a graph showing a relationship between a carrier level and a mark length of the magneto-optical disk. As Example E1, FIG. 25 shows a dependence of a carrier level (signal intensity level) on the mark length. The dependence is measured under a continuous irradiation of the recording/reproducing laser of 2.8 mW.

For comparison, FIG. 25 shows a dependence of a carrier level on the mark length as for Example A and Comparative Example A. FIG. 25 also shows a carrier level of a magneto-optical disk, which is not provided with the flux adjusting layer 17 in the construction Example E1, as Example E2. Here, Example A and Comparative Example A have the same recording and reproducing power as Embodiment 1. In Example E2, laser power is set at 6.0 mW upon recording and at 2.5 mW upon reproducing.

As compared with Comparative Example A, Example E1 and Example E2 have virtually the same carrier level as Example A. It is confirmed that Example E1 and Example E2 can expand and reproduce a domain as Example A.

Next, Example A and Example E2 have the same medium constructions. In Example A, the compensation temperature of the recording layer 3 is 50° C. and leakage flux appearing in the recording layer 3 becomes extremely small around room temperature, so that a domain is favorably expanded and reproduced; meanwhile, in Example E2, the compensation temperature of the recording layer 3 is 0° C., so that leakage flux appears around room temperature in the recording layer 3 and a domain cannot be expanded and reproduced in a favorable manner. Consequently, the carrier level of Example E2 is lower than that of Example A.

And then, when Example E1 is compared with Example E2, it is understood that Example E1 is provided with the flux adjusting layer 17 so as to regulate leakage flux appearing in the recording layer 3 around room temperature; thus, a domain is favorably expanded and reproduced in Example E1, so that the carrier level of Example E1 is higher than that of Example E2. Furthermore, it is found that the carrier level of Example E1 is higher than that of Example A. This is because: a thin film made of an alloy of rare earth transition metals, that contains more transition metal elements than the recording layer 3 of Example A, can be adopted as the recording layer 3 of Example E1; and Example E1 allows stronger leakage flux to appear in the coupling temperature area, so that the recording layer 3 and the reproducing layer 1 are magnetostatically coupled to each other more firmly; consequently, a domain can be expanded and reproduced in a more stable manner.

[SIXTH EMBODIMENT]

Referring to figures, the following explanation describes a sixth embodiment of the present invention. The present embodiment discusses a case in which a magneto-optical disk is adopted as a magneto-optical recording medium.

Figure 26:
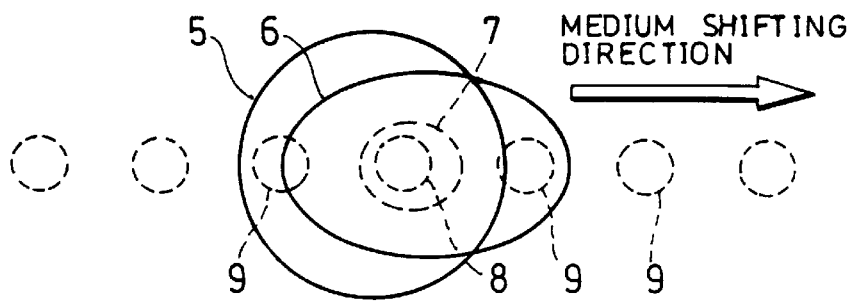
FIG. 26 is a plan diagram showing a reproducing operation of a magneto-optical disk of Embodiment 6.
Figure 27:
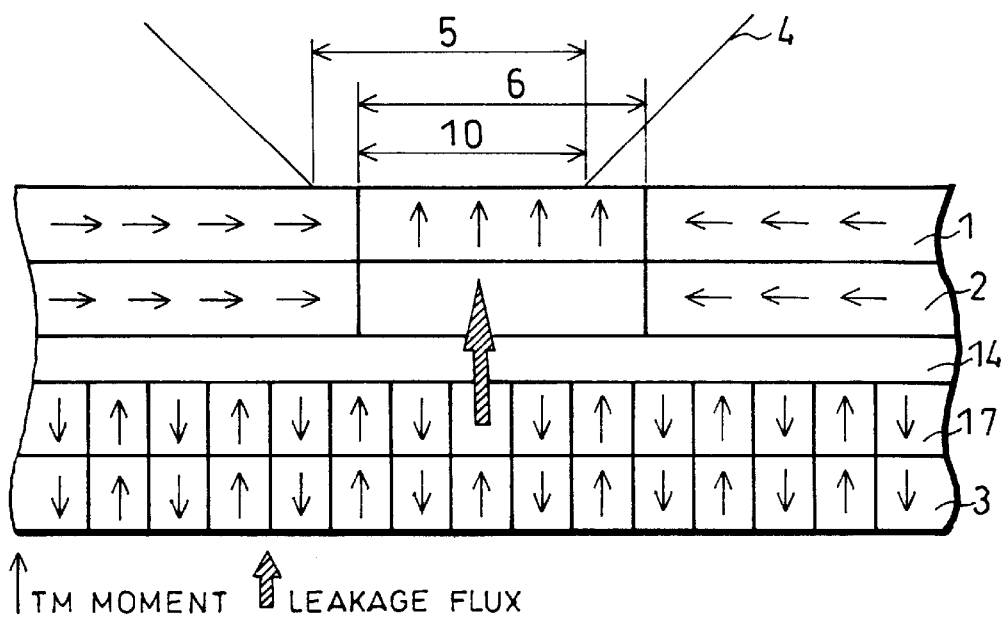
FIG. 27 is a sectional diagram showing the reproducing operation of the magneto-optical disk.

FIG. 26 is a plan view showing a state of reproduction of a sixth embodiment. FIG. 27 is a cross section of the magneto-optical disk of FIG. 26. In the sixth embodiment, a non-magnetic layer 14 is provided between an in-plane magnetic layer 2 and a flux adjusting layer 17 of the fifth embodiment shown in FIGS. 20 and 21.

A recording domain 8, which is formed in the recording layer 3, is expanded and transferred to the reproducing layer 1 and is reproduced by a light beam 4. This principle is the same as that of the fifth embodiment.

In the sixth embodiment, the non-magnetic layer 14 is formed so as to completely shield an exchange coupling between (a)the reproducing layer 1 and the in-plane magnetic layer 2 and (b)the flux adjusting layer 17 and the recording layer 3. Thus, in an area whose temperature is lower than the Curie temperature of the in-plane magnetic layer 2, it is possible to maintain in-plane magnetization in the reproducing layer 1 in a more stable manner by using the in-plane magnetic layer 2 having a smaller film thickness.

Figure 28:
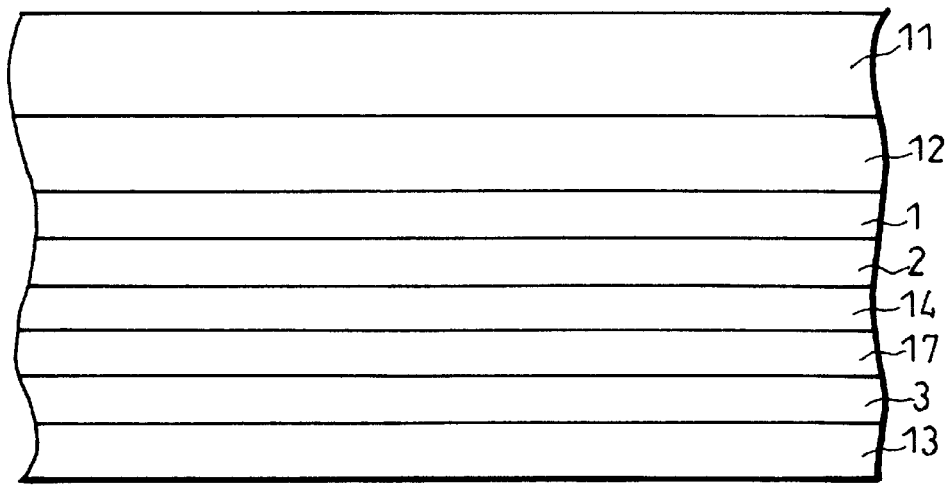
FIG. 28 is a sectional view schematically showing the construction of the magneto-optical disk.

As shown in FIG. 28, the magneto-optical recording medium of the present invention has a construction in which a transparent dielectric protecting layer 12, the reproducing layer 1, the in-plane magnetic layer 2, the non-magnetic layer 14, the flux adjusting layer 17, the recording layer 3, and a protecting layer 13 are successively formed on a magneto-optical disk substrate 11.

As for the transparent dielectric protecting layer 12, the reproducing layer 1, the in-plane magnetic layer 2, the flux adjusting layer 17, the recording layer 3, and the protecting layer 13 of the sixth embodiment, it is possible to adopt the same materials used in the fifth embodiment. However, in the sixth embodiment, the non-magnetic layer 14 shields the exchange coupling between the reproducing layer 1 and the in-plane magnetic layer 2 and the flux adjusting layer 17 and the recording layer 3, so that the in-plane magnetic layer 2 can realize a film thickness smaller than that of the fifth embodiment.

In the sixth embodiment, it is desirable to set a film thickness of the in-plane magnetic layer 2 between 5 nm and 80 nm. When the film thickness of the in-plane magnetic layer 2 is less than 5 nm, the in-plane magnetic layer 2 is too thin, so that it becomes difficult to maintain stable in-plane magnetization in an area whose temperature is not raised, resulting in degradation in quality of a reproduction signal. Meanwhile, when the film thickness of the in-plane magnetic layer 2 is more than 80 nm, recording sensitivity is considerably degraded due to an increase in the film thickness.

Moreover, the non-magnetic layer 14 has a transparent dielectric made of materials selected from AlN, SiN, AlSiN, and $Ta_2O_3$, or an alloy of non-magnetic metals made of metals including Al, Ti, Ta, and Ni. The non-magnetic layer 14 is formed in order to shield an exchange coupling between the reproducing layer 1 and the in-plane magnetic layer 2 and the recording layer 3. It is desirable to set the film thickness of the non-magnetic layer 14 between 0.5 nm and 40 nm. When the film thickness of the non-magnetic layer 14 is less than 0.5 nm, it becomes difficult to stably shield the exchange coupling between the reproducing layer 1 and the in-plane magnetic layer 2 and the recording layer 3, resulting in degradation in quality of a reproduction signal. Meanwhile, when the film thickness of the non-magnetic layer 14 is more than 40 nm, a distance between the reproducing layer 1 and the recording layer 3 is too large, so that it becomes difficult to stably maintain magnetostatic coupling between the reproducing layer 1 and the recording layer 3, resulting in degradation in quality of a reproduction signal.

Further, a thermal dispersion metal layer, which is made of materials selected from Al, AlTa, AlTi, AlCr, AlNi, AlCo, and Cu, can be further added to the above-mentioned construction, so that it is possible to improve a thermal property of the medium. Further, in some cases, an ultraviolet cure resin, a heat cure resin, or a lubricant layer can be formed on the protecting layer 13 or the thermal dispersion metal layer.

Moreover, in order to record in a low magnetic field, at a position being contact with the recording layer 3, it is also possible to stack and form a perpendicularly magnetized film such as an auxiliary recording layer having a perpendicularly magnetized film, which is made of materials selected from GdFeCo, GdTbFeCo, and GdDyFeCo. The perpendicularly magnetized film has a smaller coercivity and a higher Curie temperature as compared with the recording layer 3.

EXAMPLE 6

Next, the following explanation describes a specific example of a method for forming a magneto-optical disk having such a construction, and a method for reproducing a record.

(1) A Forming Method of the Magneto-optical Disk

The following explanation describes a forming method of the magneto-optical disk having the above-mentioned construction.

Firstly, a substrate 11, which is made of a polycarbonate formed into a disk so as to include a land and a groove, is disposed in a sputtering device which is provided with an AlSi alloy target, a GdFeCo alloy target, a GdFeSi alloy target, a TbDyFeCo alloy target, and a TbFeCo alloy target. Further, after the inside of the sputtering device has been evacuated to $1\times10^{-6}$ Torr, a mixed gas of argon and nitrogen is filled therein, electricity is applied to the AlSi alloy target so as to form a transparent dielectric protecting layer 12 made of AlSiN with a thickness of 80 nm on the substrate 11, under the condition of a gas pressure of $4\times10^{-3}$ Torr.

Next, after the inside of the sputtering device has been evacuated to $1\times10^{-6}$ Torr again, a gas of argon is filled therein, electricity is applied to the GdFeCo alloy target so as to form a reproducing layer 1 made of $Gd_{0.25}(Fe_{0.88}Co_{0.12})_{0.75}$ with a film thickness of 40 nm on the transparent dielectric protecting layer 12, under the condition of a gas pressure of $4\times10^{-3}$ Torr. The reproducing layer 1 is a perpendicularly magnetized film having a compensation temperature of 0° C. and a Curie temperature of 280° C.

And then, merely the reproducing layer 1 is made into a film, a protecting film is formed, and the magnetization is examined. As a result, it is found that the reproducing layer 1 is a perpendicularly magnetized film which continuously has perpendicular magnetization with regard to the film surface from room temperature to the Curie temperature.

And then, successively, electricity is applied to the GdFeSi alloy target so as to form an in-plane magnetic layer 2 made of $(Gd_{0.37}Fe_{0.63})_{0.80}Si_{0.20}$ with a film thickness of 20 nm on the reproducing layer 1, under the condition of a gas pressure of $4\times10^{-3}$ Torr. The in-plane magnetic layer 2 is an in-plane magnetic film having a Curie temperature of 80° C. and continuously has horizontal magnetization with regard to the film surface from room temperature to the Curie temperature.

Next, electricity is applied to the AlSi alloy target so as to form a non-magnetic layer 14 made of AlSi with a film thickness of 3 nm on the in-plane magnetic layer 2, under the condition of a gas pressure of $4\times10^{-3}$ Torr.

Next, successively, electricity is applied to the TbDyFeCo alloy target so as to form a flux adjusting layer 17 made of $(Tb_{0.5}Dy_{0.5})_{0.29}(Fe_{0.84}Co_{0.16})_{0.71}$ with a film thickness of 30 nm on the non-magnetic layer 14, under the condition of a gas pressure of $4\times10^{-3}$ Torr. The flux adjusting layer 17 is a perpendicularly magnetized film having a Curie temperature of 140° C. and continuously has an RErich composition from room temperature to the Curie temperature.

And then, successively, electricity is applied to the TbFeCo alloy target so as to form a recording layer 3 made of $Tb_{0.22}(Fe_{0.84}Co_{0.16})_{0.78}$ with a film thickness of 60 nm on the flux adjusting layer 17, under the condition of a gas pressure of $4\times10^{-3}$ Torr. The recording layer 3 is a perpendicularly magnetized film having a compensation temperature of 0° C. and a Curie temperature of 280° C., and the recording layer 3 continuously has a TMrich composition from room temperature to the Curie temperature.

Next, a mixed gas of argon and nitrogen is filled therein, electricity is applied to the AlSi alloy target so as to form a protecting layer 13 made of AlSiN with a film thickness of 20 nm on the recording layer 3, under the condition of a gas pressure of $4\times10^{-3}$ Torr.

And then, in a state in which the transparent dielectric protecting layer 12, the reproducing layer 1, the in-plane magnetic layer 2, the non-magnetic layer 14, the flux adjusting layer 17, the recording layer 3, and the protecting layer 13 are stacked, the magnetization of the reproducing layer 1 is examined. As a result, it is confirmed that the reproducing layer 1 continuously has in-plane magnetization from room temperature to the Curie temperature of the in-plane magnetic layer 2, and has perpendicular magnetization at temperatures more than the Curie temperature of the in-plane magnetic layer 2.

(2) Recording and Reproducing Property

The following explanation describes an evaluation result, in which the magneto-optical disk is evaluated by using a magneto-optical pickup which adopts a semiconductor laser having a wavelength of 680 nm, under the condition of a linear speed of 2.5 m/s.

Firstly, a recording magnetic field is modulated at ±15 kA/m under a continuous irradiation of a recording/reproducing laser of 6.0 mW, so that repeated patterns of upward magnetization and downward magnetization are formed on the recording layer 3 in accordance with the direction of the recording magnetic field. Further, a modulation frequency is changed in the recording magnetic field, so that a domain pattern having a mark length between 0.1 and 0.5 µm is recorded. Here, the mark length means that the recording domain whose length corresponds to the mark length is formed with a pitch which is twice as long as the mark length.

Figure 29:
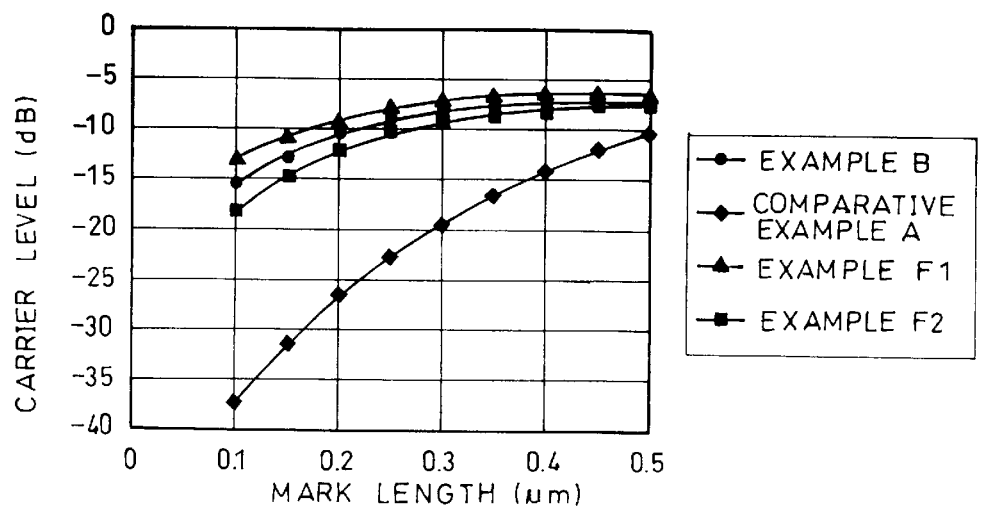
FIG. 29 is a graph showing dependence of a carrier level on a mark length, regarding one example of the magneto-optical disk.

FIG. 29 is a graph showing the relationship between a carrier level and the mark length of the magneto-optical disk. As Example F1, FIG. 29 shows a dependence of a carrier level (signal intensity level) on the mark length. The dependence is measured under a continuous irradiation of the recording/reproducing laser of 2.6 mW.

For comparison, FIG. 29 shows a dependence of a carrier level on the mark length of Example B and Comparative Example A, and shows a carrier level of a magneto-optical disk, which is not provided with the flux adjusting layer 17 in the construction Example F1, as Example F2. Here, Example B and Comparative Example A have the same recording and reproducing power as Embodiment 2. In Example F2, laser power is set at 5.7 mW upon recording and at 2.4 mW upon reproducing.

As compared with Comparative Example A, Example F1 and Example F2 obtain virtually the same carrier level as Example B. It is confirmed that Example F1 and Example F2 can expand and reproduce a domain as Example B.

Next, Example B and Example F2 have the same medium constructions. In Example B, the compensation temperature of the recording layer 3 is 50° C. and leakage flux appearing in the recording layer 3 becomes extremely small around room temperature, so that a domain is favorably expanded and reproduced; meanwhile, in Example F2, the compensation temperature of the recording layer 3 is 0° C. and leakage flux appears around room temperature in the recording layer 3, so that a domain cannot be expanded and reproduced in a favorable manner. Consequently, the carrier level of Example F2 is lower than that of Example B.

And then, when Example F1 is compared with Example F2, it is found that the flux adjusting layer 17 is provided so as to regulate leakage flux appearing in the recording layer 3 around room temperature; thus, a domain is favorably expanded and reproduced, so that the carrier level of Example F1 is higher than that of Example F2. Furthermore, it is found that the carrier level of Example F1 is higher than that of Example B. This is because: a thin film made of an alloy of rare earth transition metals, that contains more transition metal elements than the recording layer 3 of Example B, can be adopted as the recording layer 3 of Example F1, and Example F1 allows stronger leakage flux to appear in the coupling temperature area, so that the recording layer 3 and the reproducing layer 1 are magnetostatically coupled to each other more firmly; consequently, a domain can be expanded and reproduced in a more stable manner.

As described above, the magneto-optical recording medium of the present invention forms a reproducing layer which has perpendicularly magnetization from room temperature to the Curie temperature, in a single layer, an in-plane magnetic layer which has in-plane magnetization from room temperature to the Curie temperature, and a recording layer which has perpendicularly magnetization from room temperature to the Curie temperature. When the reproducing layer, the in-plane magnetic layer, and the recording layer have the Curie temperatures of Tc1, Tc2, and Tc3, Tc2<Tc1 and Tc2<Tc3 are satisfied. In an area whose temperature is less than Tc2, the reproducing layer has in-plane magnetization due to an exchange coupling with the in-plane magnetic layer, and in an area whose temperature is more than Tc2 of the reproducing layer, the magnetization information of the recording layer is expanded and transferred so as to form single-domain perpendicular magnetization.

Further, the magneto-optical recording medium of the present invention forms a reproducing layer which has perpendicularly magnetization from room temperature to the Curie temperature, in a single layer, an in-plane magnetic layer which has in-plane magnetization from room temperature to the Curie temperature, and a recording layer which has perpendicularly magnetization from room temperature to the Curie temperature. When the reproducing layer, the in-plane magnetic layer, and the recording layer have the Curie temperatures of Tc1, Tc2, and Tc3, Tc2<Tc1 and Tc2<Tc3 are satisfied. At a temperature more than Tc2, as for the reproducing layer and the recording layer, the total magnetization reaches a maximum value.

Also, with the above arrangement, the magneto-optical recording medium of the present invention is also allowed to have a construction in which the reproducing layer and the recording layer have virtually the same maximum values of total magnetization.

Further, with the above arrangement, the magneto-optical recording medium of the present invention is also allowed to have a construction in which a non-magnetic layer is provided between the in-plane magnetic layer and the recording layer.

Moreover, with the above arrangement, the magneto-optical recording medium of the present invention is also allowed to have a construction in which a second in-plane magnetic layer is provided so as to have in-plane magnetization, whose Curie temperature is higher than Tc2 and lower than Tc1 and Tc3, between the in-plane magnetic layer and the recording layer.

Furthermore, with the above arrangement, the magneto-optical recording medium of the present invention is also allowed to have a construction in which the non-magnetic layer is provided between the second in-plane magnetic layer and the recording layer.

Also, with the above arrangement, the magneto-optical recording medium of the present invention is also allowed to have a construction in which a flux adjusting layer is provided so as to have a Curie temperature higher than Tc2 and lower than Tc1 and Tc3, and perpendicular magnetization whose magnetic polarity is different from that of the recording layer, between the in-plane magnetic layer and the recording layer.

Further, with the above arrangement, the magneto-optical recording medium of the present invention is also allowed to have a construction in which the non-magnetic layer is provided between the flux adjusting layer and the in-plane magnetic layer.

Furthermore, a reproducing device of the present invention, which reproduces magnetic information recorded in the recording layer of the magneto-optical recording medium, is also allowed to include a means for emitting laser beam on the magneto-optical recording medium upon reproduction so as to heat the in-plane magnetic layer to more than the Curie temperature.

Moreover, the reproducing device of the present invention, which reproduces magnetization information recorded in the recording layer of the magneto-optical recording medium, is also allowed to include a means for emitting laser beam on the magneto-optical recording medium upon reproduction so as to heat the reproducing layer and the recording layer to around a temperature which allows the total magnetization to reach the maximum value.

As described above, according to the present invention, magnetization information recorded in the recording layer is expanded and transferred the reproducing layer. Hence, even in the case when a signal is recorded in a recording layer in a period which does not allow a reproduction light beam having a light beam spot diameter determined by an optical diffraction limit to reproduce, it is possible to reproduce the signal without reducing amplitude of the reproduction signal.

Further, if maximum values of total magnetization of the recording layer and the reproducing layer is obtained at a temperature more than the Curie temperature of the in-plane magnetization layer, a smooth expansion and reproduction of a signal can be realized.

The non-magnetic layer is inserted between the in-plane magnetization layer and the recording layer so as to shield the exchange coupling between the in-plane magnetization layer and the recording layer; thus, it is possible to reduce the film thickness of the in-plane magnetization layer, resulting in reduction of the recording power and reproducing power.

Moreover, the second in-plane magnetization layer or the flux adjusting layer is provided between the in-plane magnetization layer and the recording layer so as to regulate leakage flux appearing in the recording layer of a low temperature area; thus, a shorter mark length can stably expand and transfer magnetization information recorded in the recording layer to the reproducing layer. Furthermore, the non-magnetic layer shields the exchange coupling between the flux adjusting layer and the recording layer, thereby reducing the film thickness of the flux adjusting layer; consequently, the recording power and the reproducing power can be reduced.

Also, the reproducing device of the present invention makes it possible to properly reproduce the magneto-optical medium of the present invention and to achieve a favorable quality of a reproduction signal.

The invention being thus described, it will be obvious that the same may be varied in many ways. Such variations are not to be. regarded as a departure from the spirit and scope of the invention, and all such modifications as would be obvious to one skilled in the art are intended to be included within the scope of the following claims.

What is claimed is:

1. A magneto-optical recording medium, comprising three layers formed in the following sequence:
    a reproducing layer which has perpendicular magnetization from room temperature to a Curie temperature, in a single reproducing layer,
    a first in-plane magnetic layer which has in-plane magnetization from room temperature to a Curie temperature of the first in-plane magnetic layer, and
    a recording layer which has perpendicular magnetization from room temperature to a Curie temperature of the recording layer,
        wherein Tc2<Tc1 and Tc2<Tc3 are satisfied, where Tc1 represents the Curie temperature of said reproducing layer, Tc2 represents the Curie temperature of said in-plane magnetic layer, and Tc3 represents the Curie temperature of said recording layer; and
        said reproducing layer includes an area which has a temperature of less than Tc2 and has in-plane magnetization due to an exchange coupling with said in-plane magnetic layer, and an area which has a temperature of more than Tc2 and has single-domain perpendicular magnetization due to expansion and transfer of magnetization information from said recording layer to said reproducing layer.

2. The magneto-optical recording medium as defined in claim 1, wherein said reproducing layer and said recording layer have maximum total magnetization values at the temperatures higher than Tc2, respectively.

3. The magneto-optical recording medium as defined in claim 2, wherein said reproducing layer and said recording layer have maximum total magnetization values at virtually the same temperatures.

4. The magneto-optical recording medium as defined in claim 1, further comprising a non-magnetic layer between said in-plane magnetic layer and said recording layer.

5. The magneto-optical recording medium as defined in claim 1, further comprising a second in-plane magnetic layer, which has in-plane magnetization from room temperature to the Curie temperature, between said in-plane magnetic layer and said recording layer, wherein said second in-plane magnetic layer has a Curie temperature which is higher than Tc2 and lower than Tc1 and Tc3.

6. The magneto-optical recording medium as defined in claim 5, further comprising a non-magnetic layer between said second in-plane magnetic layer and said recording layer.

7. The magneto-optical recording medium as defined in claim 1, further comprising a flux adjusting layer having perpendicular magnetization whose magnetic polarity is different from that of said recording layer, between said in-plane magnetic layer and said recording layer, wherein said flux adjusting layer has a Curie temperature which is higher than Tc2 and lower than Tc1 and Tc3.

8. The magneto-optical recording medium as defined in claim 7, further comprising a non-magnetic layer between said flux adjusting layer and said in-plane magnetic layer.

9. The magneto-optical recording medium as defined in claim 1, wherein said reproducing layer has a Curie temperature Tc1 between 200° C. and 360° C.

10. The magneto-optical recording medium as defined in claim 1, wherein said reproducing layer has a film thickness between 20 nm and 80 nm.

11. The magneto-optical recording medium as defined in claim 1, wherein said in-plane magnetic layer has a Curie temperature Tc2 between 40° C. and 140° C.

12. The magneto-optical recording medium as defined in claim 1, wherein said in-plane magnetic layer has a film thickness between 40 nm and 80 nm.

13. The magneto-optical recording medium as defined in claim 1, wherein said recording layer has a Curie temperature Tc3 between 180° C. and 300° C.

14. The magneto-optical recording medium as defined in claim 1, wherein said recording layer has a film thickness between 30 nm and 120 nm.

15. The magneto-optical recording medium as defined in claim 4, wherein said in-plane magnetic layer has a film thickness between 5 nm and 80 nm, and said non-magnetic layer has a film thickness between 0.5 nm and 40 nm.

16. The magneto-optical recording medium as defined in claim 5, wherein said second in-plane magnetic layer has a Curie temperature between 100° C. and 220° C.

17. The magneto-optical recording medium as defined in claim 5, wherein said in-plane magnetic layer has a film thickness of 5 nm or more, said second in-plane magnetic layer has a film thickness of 40 nm or more, and said in-plane magnetic layer and said second in-plane magnetic layer have a total film thickness of 80 nm or less.

18. The magneto-optical recording medium as defined in claim 6, wherein said in-plane magnetic layer has a film thickness of 5 nm or more, said second in-plane magnetic layer has a film thickness of 5 nm or more, said in-plane magnetic layer and said second in-plane magnetic layer have a total film thickness of 80 nm or less, and said non-magnetic layer has a film thickness between 0.5 nm and 40 nm.

19. The magneto-optical recording medium as defined in claim 7, wherein said flux adjusting layer has the Curie temperature between Tc3−120° C. and Tc3−60° C.

20. The magneto-optical recording medium as defined in claim 7, wherein said recording layer has a film thickness of 30 nm or more, said flux adjusting layer has a film thickness of 10 nm or more, said recording layer and said flux adjusting layer have a total film thickness of 120 nm or less.

21. A magneto-optical recording medium, comprising three layers formed in the following sequence:
a reproducing layer which has perpendicular magnetization from room temperature to a Curie temperature, in a single reproducing layer,
a first in-plane magnetic layer which has in-plane magnetization from room temperature to a Curie temperature of said first in-plane magnetic layer, and
a recording layer which has perpendicular magnetization from room temperature to a Curie temperature of the recording layer,
wherein said reproducing layer, is made of a perpendicular magnetic film, becomes in-plane magnetized as said layer exchange-couples with said in-plane magnetic layer which has in-plane magnetization;
Tc2<Tc1 and Tc2<Tc3 are satisfied, where Tc1 represents the Curie temperature of said reproducing layer, Tc2 represents the Curie temperature of said in-plane magnetic layer, and Tc3 represents the Curie temperature of said recording layer; and
said reproducing layer and said recording layer have maximum total magnetization values at a temperatures higher than Tc2, respectively.

22. The magneto-optical recording medium as defined in claim 21, wherein said reproducing layer and said recording layer have the maximum total magnetization values at virtually the same temperatures.

23. The magneto-optical recording medium as defined in claim 21, further comprising a non-magnetic layer between said in-plane magnetic layer and said recording layer.

24. The magneto-optical recording medium as defined in claim 21, further comprising a second in-plane magnetic layer which has in-plane magnetization from room temperature to a Curie temperature, between said in-plane magnetic layer and said recording layer, wherein said second in-plane magnetic layer has a Curie temperature which is higher than Tc2 and lower than Tc1 and Tc3.

25. The magneto-optical recording medium as defined in claim 24, further comprising a non-magnetic layer between said second in-plane magnetic layer and said recording layer.

26. The magneto-optical recording medium as defined in claim 21, further comprising a flux adjusting layer having perpendicular magnetization whose magnetic polarity is different from that of said recording layer, between said in-plane magnetic layer and said recording layer, wherein said flux adjusting layer has a Curie temperature which is higher than Tc2 and lower than Tc1 and Tc3.

27. The magneto-optical recording medium as defined in claim 26, further comprising a non-magnetic layer between said flux adjusting layer and said in-plane magnetic layer.

28. A reproducing device for reproducing magnetization information recorded in a magneto-optical recording medium, said magneto-optical recording medium including a reproducing layer which has perpendicular magnetization from room temperature to a Curie temperature, in a single reproducing layer, a first in-plane magnetic layer which has in-plane magnetization from room temperature to a Curie temperature, and a recording layer which has perpendicular of the first in-plane magnetic layer from room temperature to the Curie temperature of the recording layer, the three layers formed in the above sequence,
wherein Tc2<Tc1 and Tc2<Tc3 are satisfied, where Tc1 represents the Curie temperature of said reproducing layer, Tc2 represents the Curie temperature of said in-plane magnetic layer, and Tc3 represents the Curie temperature of said recording layer; and said reproducing layer includes an area which has a temperature of less than Tc2 and has in-plane magnetization due to an exchange coupling with said in-plane magnetic layer, and an area which has a temperature of more than Tc2 and has single-domain perpendicular magnetization due to expansion and transfer of magnetization information from said recording layer to said reproducing layer, said reproducing device comprising:
  light emitting means for emitting light on said magneto-optical recording medium and
  light receiving means for receiving light reflected from said magneto-optical recording medium, wherein upon reproduction, said light emitting means emits light on said magneto-optical recording medium so as to heat said in-plane magnetic layer to more than the Curie temperature.

29. A reproducing device for reproducing magnetization information recorded in a magneto-optical recording medium, said magneto-optical recording medium including: a reproducing layer which has perpendicular magnetization from room temperature to a Curie temperature, in a single reproducing layer; a first in-plane magnetic layer which has in-plane magnetization from room temperature to a Curie temperature; and a recording layer which has perpendicular magnetization of the first in-plane magnetic layer from room temperature to a Curie temperature of the recording layer, the three layers formed in the above sequence, wherein said reproducing layer, made of a perpendicular magnetic film, becomes in-plane magnetized as said layer exchange-couples with said in-plane magnetic layer which has in-plane magnetization;

Tc2<Tc1 and Tc2<Tc3 are satisfied, where Tc1 represents the Curie temperature of said reproducing layer, Tc2 represents the Curie temperature of said in-plane magnetic layer, and Tc3 represents the Curie temperature of said recording layer; and said reproducing layer and said recording layer have maximum total magnetization values at temperatures higher than Tc2, respectively, said reproducing device comprising:
  light emitting means for emitting light on said magneto-optical recording medium and
  light receiving means for receiving light reflected from said magneto-optical recording medium, wherein upon reproduction, said light emitting means emits light on said magneto-optical recording medium so as to heat said in-plane magnetic layer to more than the Curie temperature.

30. The reproducing device as defined in claim 29, wherein said reproducing layer and said recording layer have the maximum total magnetization values at virtually the same temperatures in said magneto-optical recording medium, and upon reproduction, said light emitting means emits light on said magneto-optical recording medium so as to heat said reproducing layer and said recording layer to around a temperature where total magnetization values thereof are maximized.

* * * * *